US008375146B2

(12) United States Patent
Sinclair

(10) Patent No.: US 8,375,146 B2
(45) Date of Patent: Feb. 12, 2013

(54) RING BUS STRUCTURE AND ITS USE IN FLASH MEMORY SYSTEMS

(75) Inventor: Alan Welsh Sinclair, Falkirk (GB)

(73) Assignee: SanDisk Technologies, Inc., Plano, TX (US)

( * ) Notice: Subject to any disclaimer, the term of this patent is extended or adjusted under 35 U.S.C. 154(b) by 1196 days.

(21) Appl. No.: 10/915,039

(22) Filed: Aug. 9, 2004

(65) Prior Publication Data

US 2006/0031593 A1 Feb. 9, 2006

(51) Int. Cl.
*G06F 15/16* (2006.01)
*G06F 15/177* (2006.01)
*G06F 15/173* (2006.01)

(52) U.S. Cl. ......... 709/251; 709/220; 709/221; 709/226

(58) Field of Classification Search ............... 709/251
See application file for complete search history.

(56) References Cited

U.S. PATENT DOCUMENTS

| | | | |
|---|---|---|---|
| 4,034,036 A | | 7/1977 | Farrell et al. |
| 4,406,004 A | * | 9/1983 | Hall et al. ................ 370/249 |
| 4,527,270 A | * | 7/1985 | Sweeton ..................... 714/47 |
| 4,675,671 A | | 6/1987 | Ishizuka et al. |
| 5,031,139 A | | 7/1991 | Sinclair |
| 5,043,940 A | | 8/1991 | Harari |
| 5,070,032 A | | 12/1991 | Yuan et al. |
| 5,072,424 A | | 12/1991 | Brent et al. |
| 5,095,344 A | | 3/1992 | Harari |
| 5,172,338 A | | 12/1992 | Mehrotra et al. |
| 5,255,371 A | * | 10/1993 | Latimer et al. .............. 710/5 |
| 5,313,421 A | | 5/1994 | Guterman et al. |
| 5,315,541 A | | 5/1994 | Harari et al. |
| 5,343,063 A | | 8/1994 | Yuan et al. |
| 5,414,762 A | * | 5/1995 | Flisik et al. ................ 379/198 |
| 5,444,695 A | * | 8/1995 | Copley et al. .............. 370/452 |
| 5,570,315 A | | 10/1996 | Tanaka et al. |
| 5,570,425 A | * | 10/1996 | Goodman et al. ......... 381/71.11 |
| 5,661,053 A | | 8/1997 | Yuan |
| 5,774,397 A | | 6/1998 | Endoh et al. |
| 5,787,459 A | * | 7/1998 | Stallmo et al. ............. 711/112 |
| 5,798,968 A | | 8/1998 | Lee et al. |
| 5,827,467 A | | 10/1998 | Ruppert et al. |
| 5,890,192 A | | 3/1999 | Lee et al. |

(Continued)

FOREIGN PATENT DOCUMENTS

| | | |
|---|---|---|
| EP | 1 271 553 A2 | 1/2003 |
| GB | 1010603 A | 11/1965 |
| GB | 2244826 A | 11/1991 |
| JP | H03-179952 | 8/1991 |

(Continued)

OTHER PUBLICATIONS

Ohnishi et al.; ATM Ring Protocol and Performance; 1989; IEEE; CH2655-9/89/0000-0394; pp. 0394-0398.*

(Continued)

*Primary Examiner* — Abdullahi Salad
*Assistant Examiner* — Richard G Keehn
(74) *Attorney, Agent, or Firm* — Davis Wright Tremaine LLP

(57) ABSTRACT

A system and integrated circuit chips used in the system utilize a bus in the form of a ring to interconnect nodes of individual components for transfer of data and commands therebetween. An example system described is a memory having one or more re-programmable non-volatile memory cell arrays connected to each other and to a system controller by a ring bus.

37 Claims, 23 Drawing Sheets

U.S. PATENT DOCUMENTS

| | | | |
|---|---|---|---|
| 5,908,468 | A | 6/1999 | Hartmann |
| 5,930,167 | A | 7/1999 | Lee et al. |
| 6,021,465 | A | 2/2000 | Bräu et al. |
| 6,034,878 | A | 3/2000 | Osaka et al. |
| 6,046,935 | A | 4/2000 | Takeuchi et al. |
| 6,222,762 | B1 | 4/2001 | Guterman et al. |
| 6,237,791 | B1 | 5/2001 | Beck et al. |
| 6,266,273 | B1 | 7/2001 | Conley et al. |
| 6,456,528 | B1 | 9/2002 | Chen |
| 6,522,580 | B2 | 2/2003 | Chen et al. |
| 6,574,719 | B2 | 6/2003 | Arimilli et al. |
| 6,611,537 | B1 * | 8/2003 | Edens et al. ............... 370/503 |
| 6,625,687 | B1 | 9/2003 | Halbert et al. |
| 6,640,322 | B1 | 10/2003 | Schulz |
| 6,658,509 | B1 | 12/2003 | Bonella et al. |
| 6,687,757 | B1 | 2/2004 | Ben-Ze'ev et al. |
| 6,697,373 | B1 * | 2/2004 | Sandstrom ................... 370/405 |
| 6,952,533 | B2 * | 10/2005 | Kim et al. .................... 398/166 |
| 7,239,606 | B2 * | 7/2007 | Gilmour et al. ............. 370/222 |
| 2002/0069272 | A1 * | 6/2002 | Kim et al. ..................... 709/221 |
| 2002/0091865 | A1 | 7/2002 | Parady |
| 2002/0099904 | A1 | 7/2002 | Conley |
| 2003/0020703 | A1 * | 1/2003 | Holub .......................... 345/207 |
| 2003/0109093 | A1 | 6/2003 | Harari et al. |
| 2003/0140109 | A1 | 7/2003 | Pospesel et al. |
| 2003/0147278 | A1 | 8/2003 | Tanaka et al. |
| 2004/0156323 | A1 * | 8/2004 | Cao ............................... 370/258 |
| 2006/0038023 | A1 * | 2/2006 | Brewer et al. ................ 235/492 |

FOREIGN PATENT DOCUMENTS

| | | |
|---|---|---|
| JP | H03-262234 | 11/1991 |
| JP | H04-156741 | 5/1992 |
| WO | WO 2006/017725 A2 | 2/2006 |

OTHER PUBLICATIONS

Scott Hauck; "The Roles of FPGAs in Reprogrammable Systems"; Apr. 1998; 36 pages.*

ISA/EPO, "Notification of Transmittal of the International Search Report and the Written Opinion of the International Searching Authority, or the Declaration," mailed in related International Application No. PCT/US2005/027866 on Jul. 3, 2006, 12 pages.

EPO, "Examiner's first full report," corresponding in European Patent Application No. 05 807 457.6 on Jul. 25, 2007, 6 pages.

International Search Report from corresponding application PCT/US2005/028538.

EPO, "Examination Communication," corresponding European Patent Application No. 05 807 457.6 on Sep. 12, 2008, 5 pages.

State Intellectual Property Office (SIPO), "1st Office Action," corresponding Chinese Patent Application No. 200580031817.4 on Oct. 10, 2008, 15 pages (w/translation).

State Intellectual Property Office (SIPO), "Second Office Action," corresponding Chinese Patent Application No. 200580031817.4 dated Jun. 5, 2009, (w/translation), and pending claims, 15 pages.

Notice of Reasons for Refusal, Japanese Patent Application No. 2007-525676 dated May 31, 2011, 7 pages.

Listing of Claims for Japanese Patent Application No. 2007-525676 filed Aug. 3, 2005, 11 pages.

Notice of Reasons for Refusal including List of Pending Claims, Japanese Patent Application No. 2007-525676 dated Sep. 11, 2012, 15 pages.

Notice of Reasons for Refusal, Japanese Patent Application No. 2007-525676 dated Mar. 27, 2012, 4 pages.

Listing of Claims for Japanese Patent Application No. 2007-525676 tiled Aug. 3, 2005, 11 pages.

Office Action for Taiwanese Application No. 094127024 dated May 15, 2012, 27 pages.

Listing of Claims for Taiwanese Patent Application No. 094127024 filed Aug. 9, 2005, 11 pages.

* cited by examiner

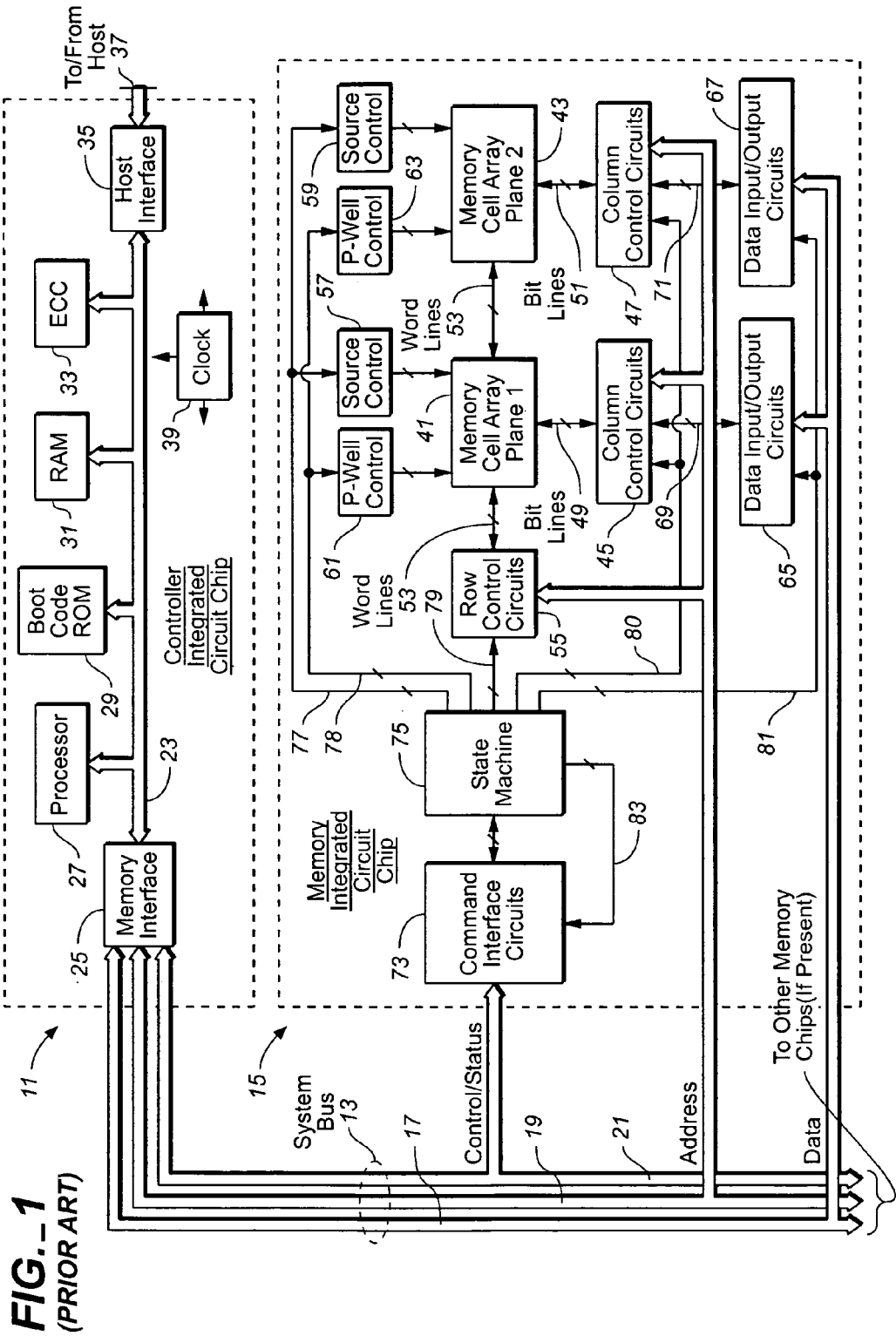
FIG._1
(PRIOR ART)

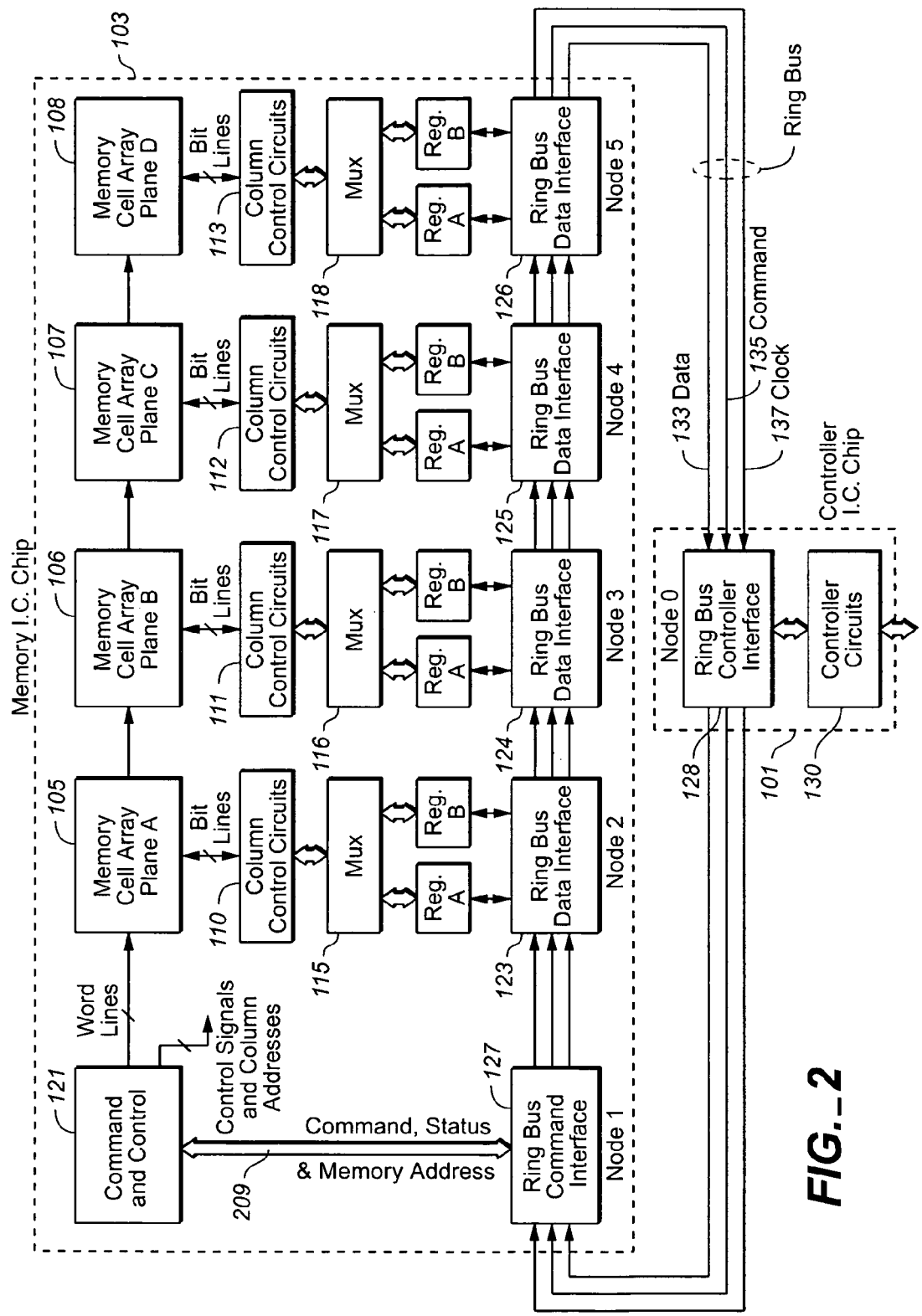
FIG._2

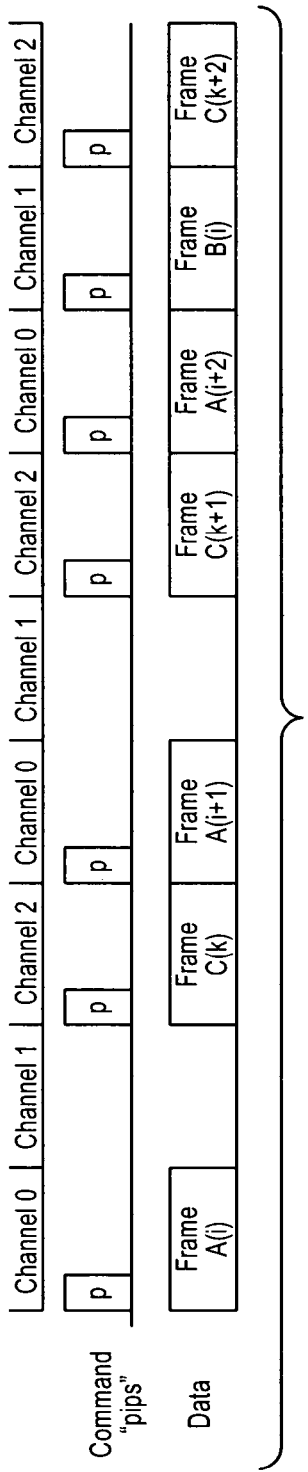
FIG._3A
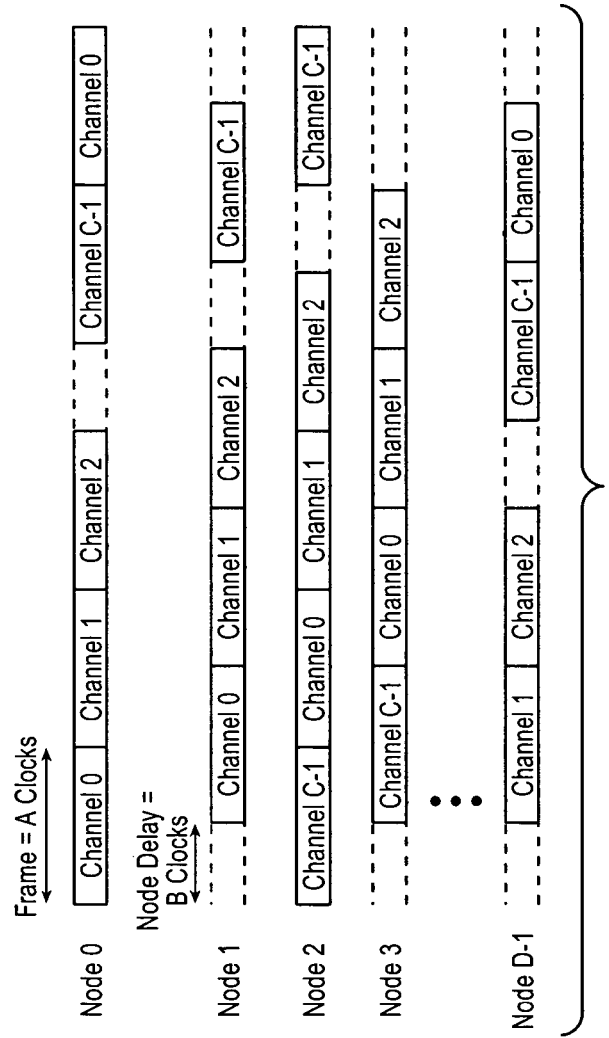
FIG._3B

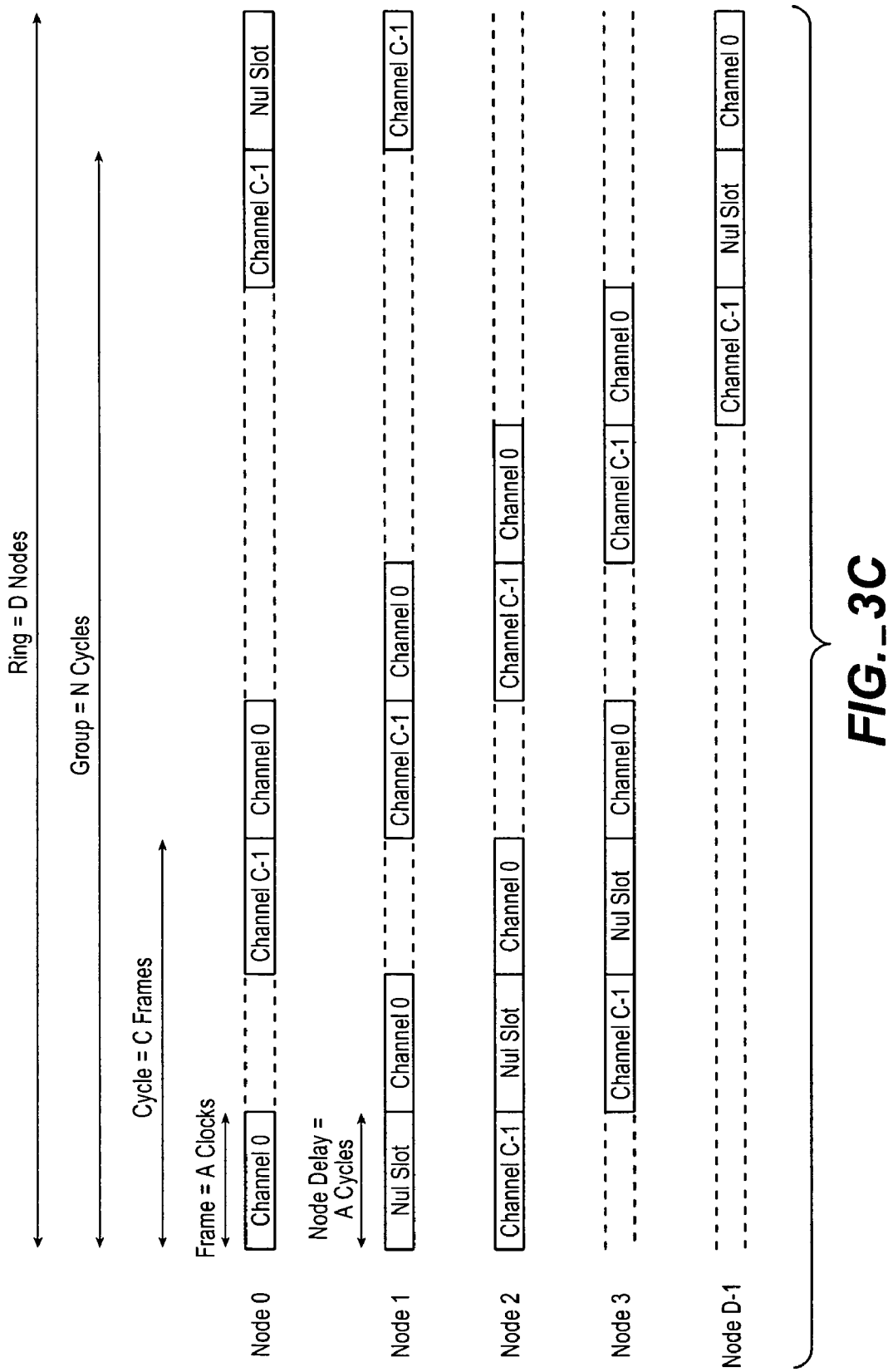
FIG._3C

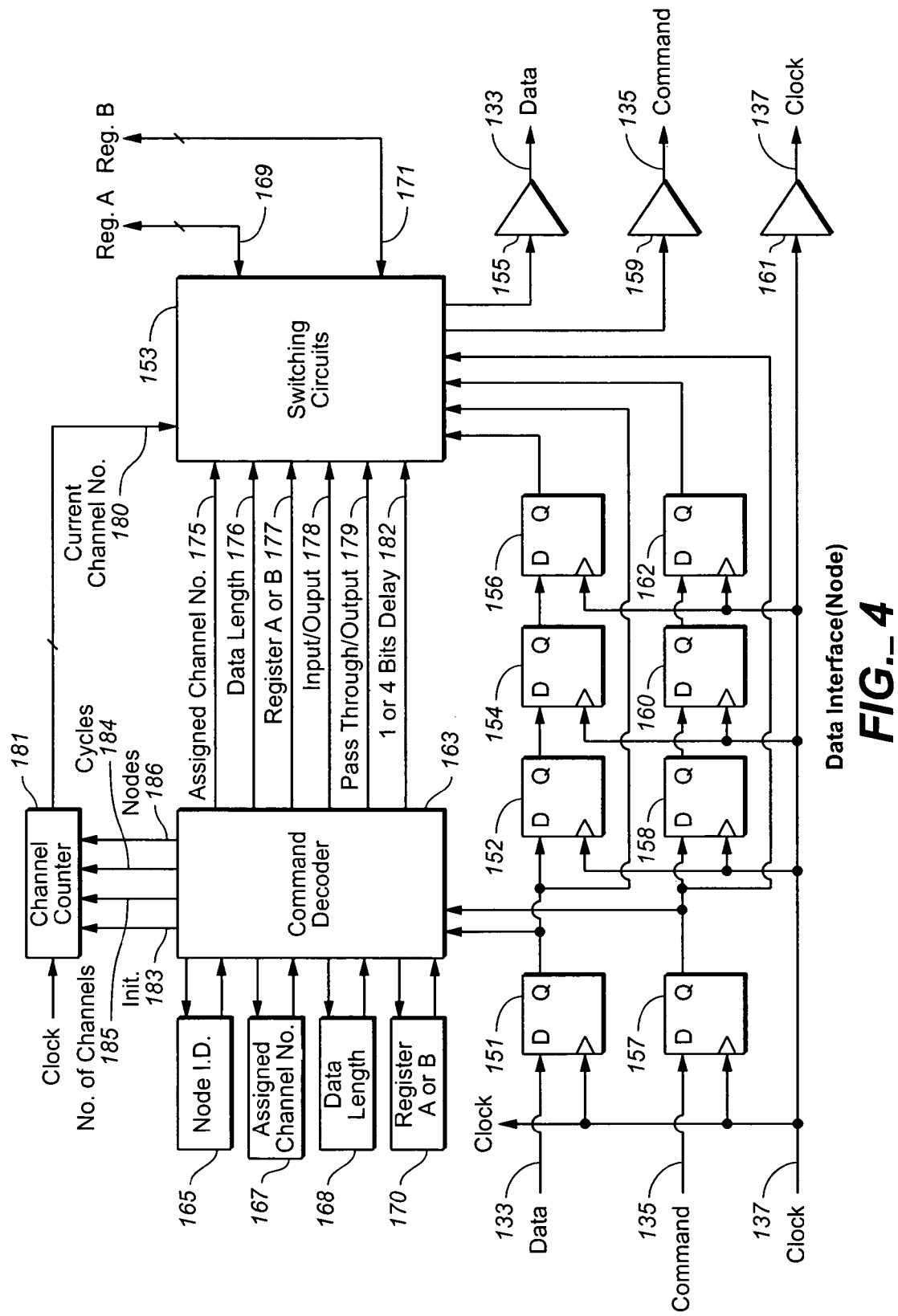
FIG._4

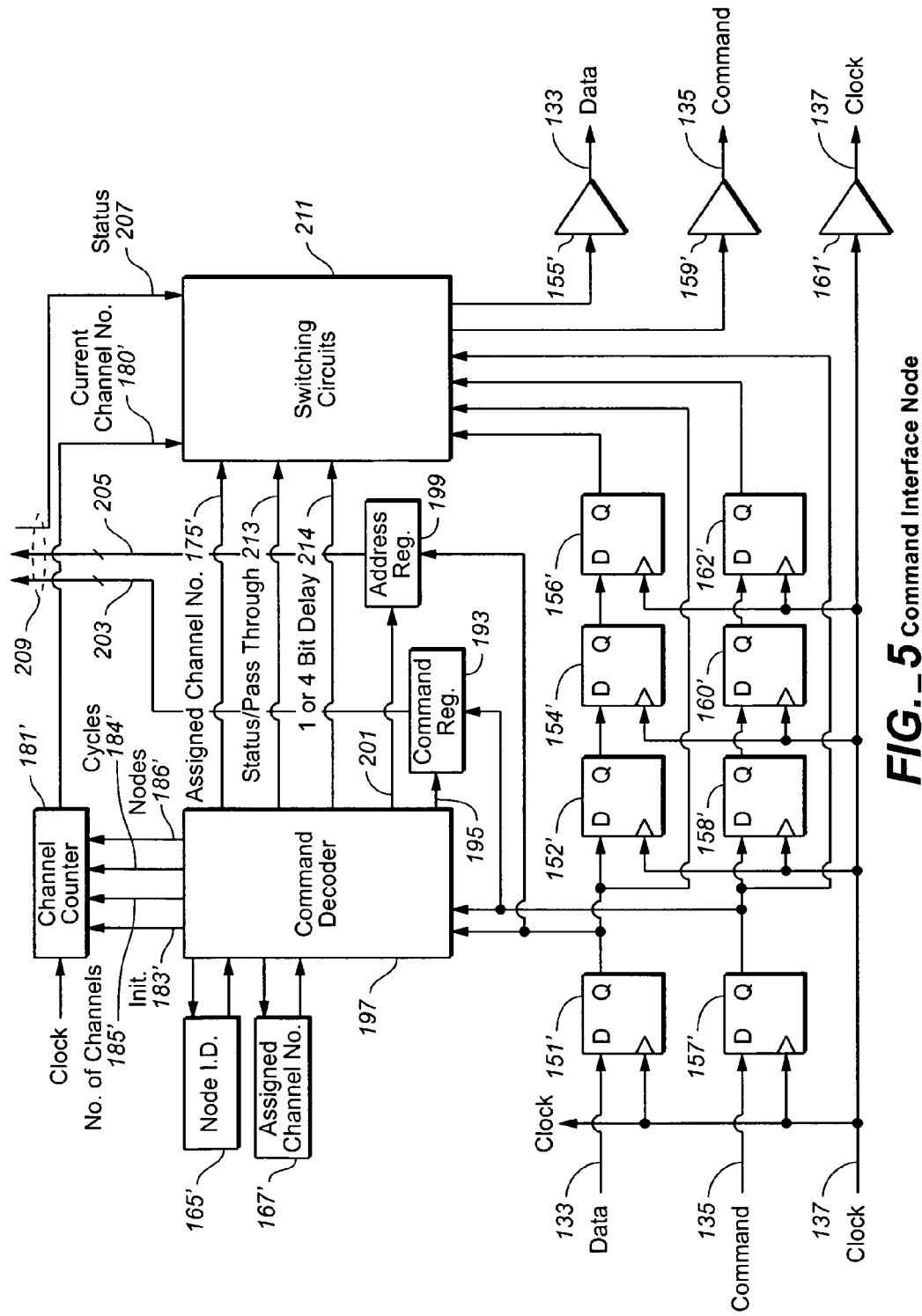

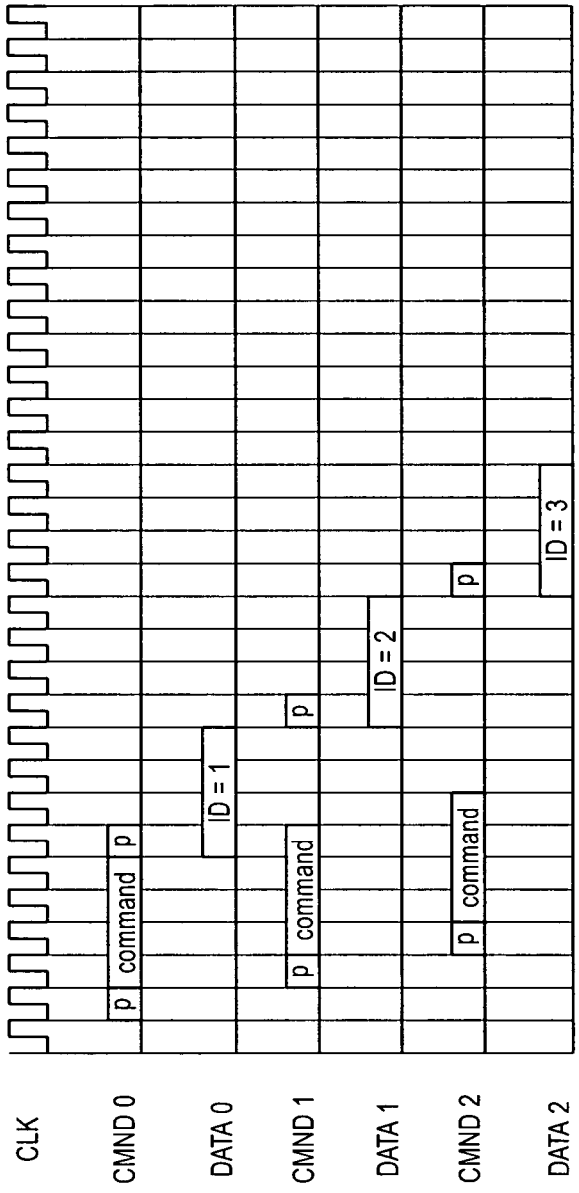
FIG._6A

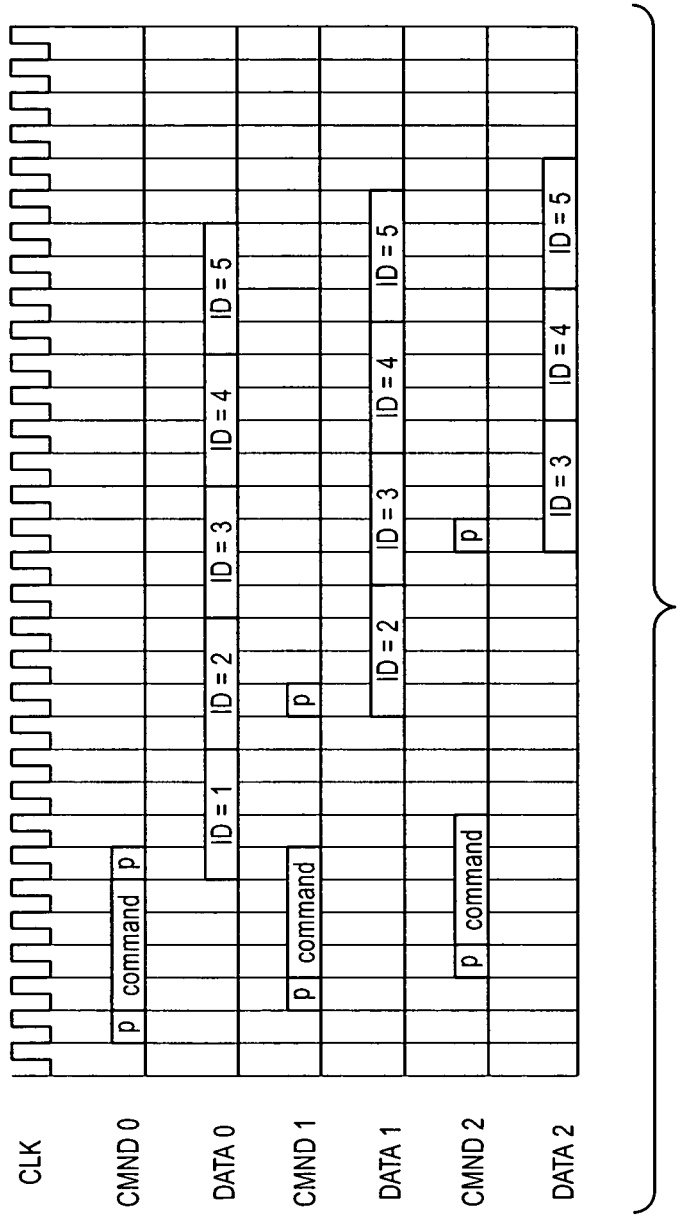
FIG._6B

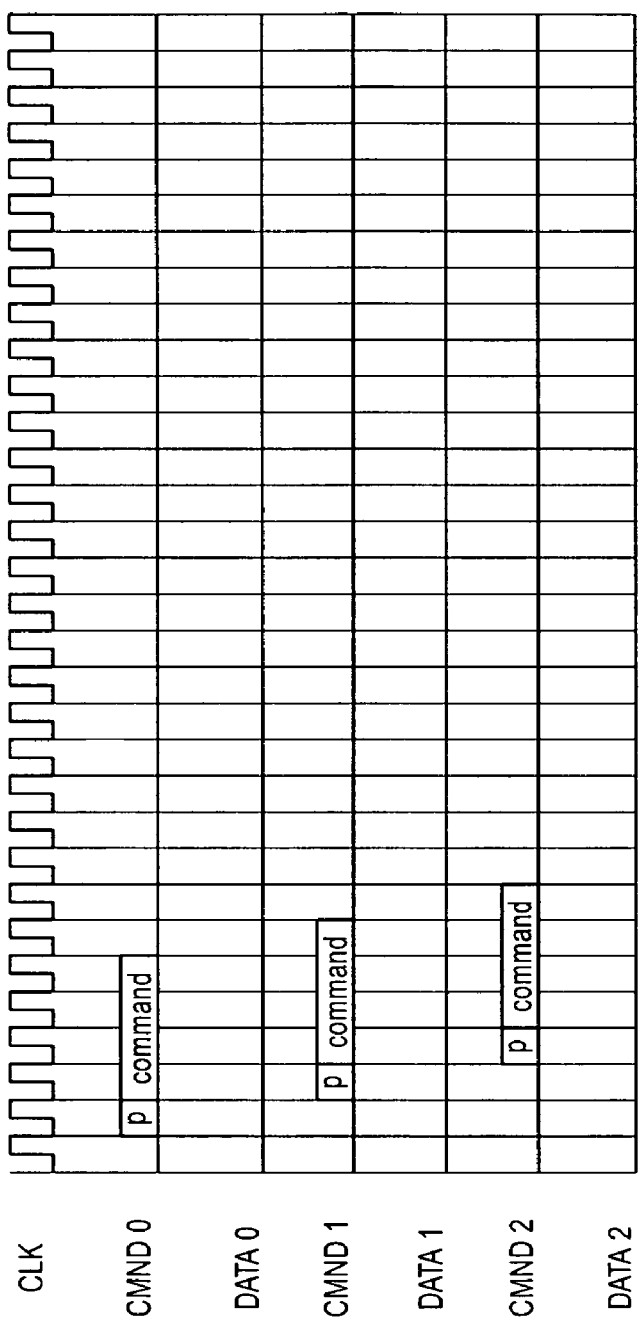
FIG._6C

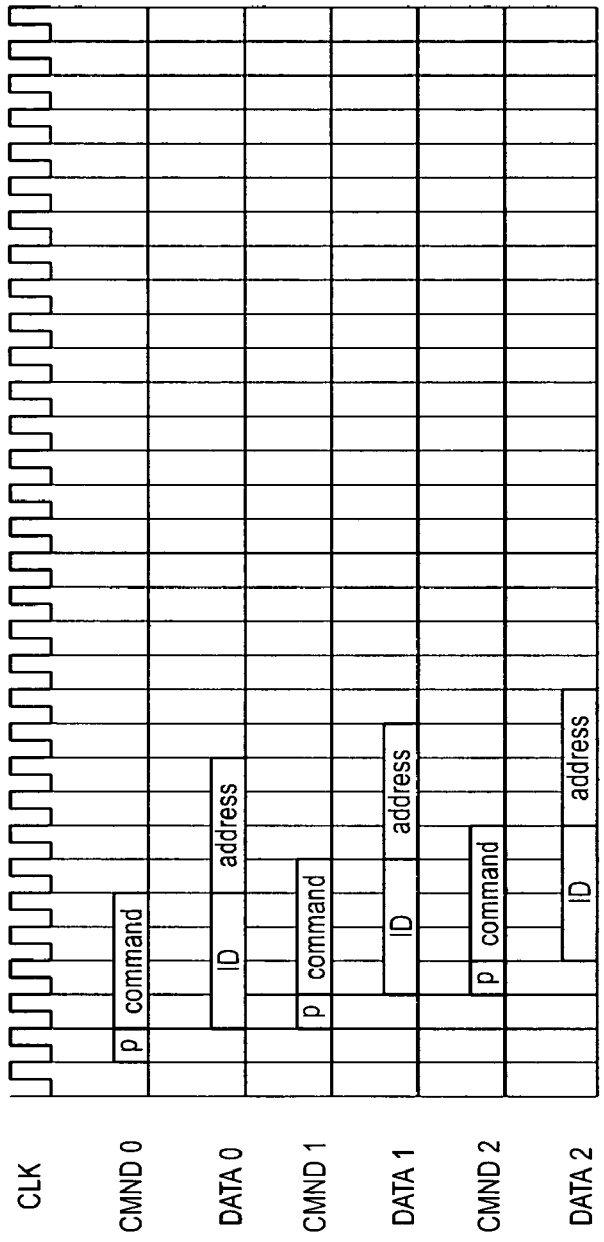
FIG._6D

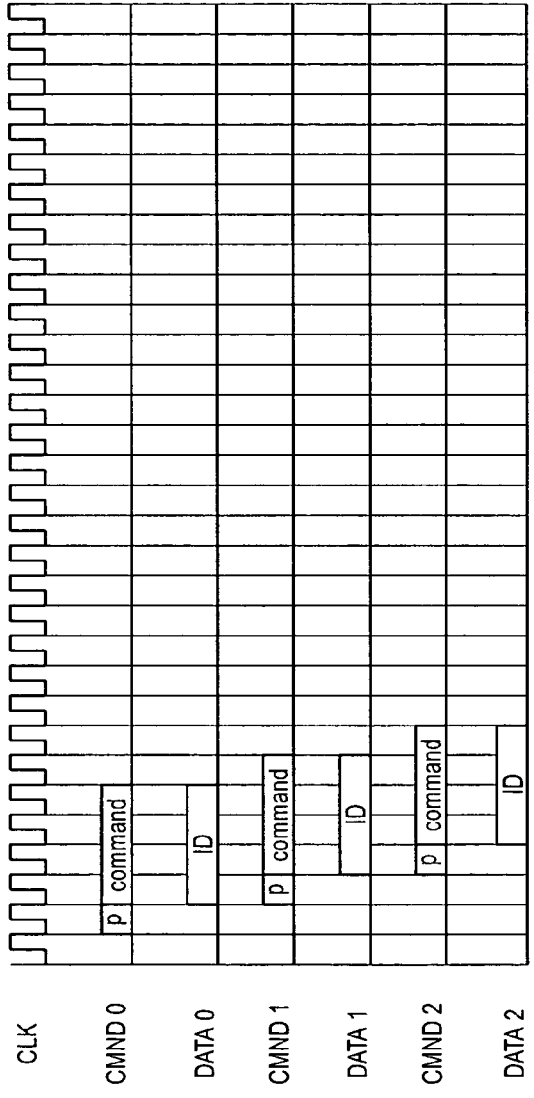
FIG._6E

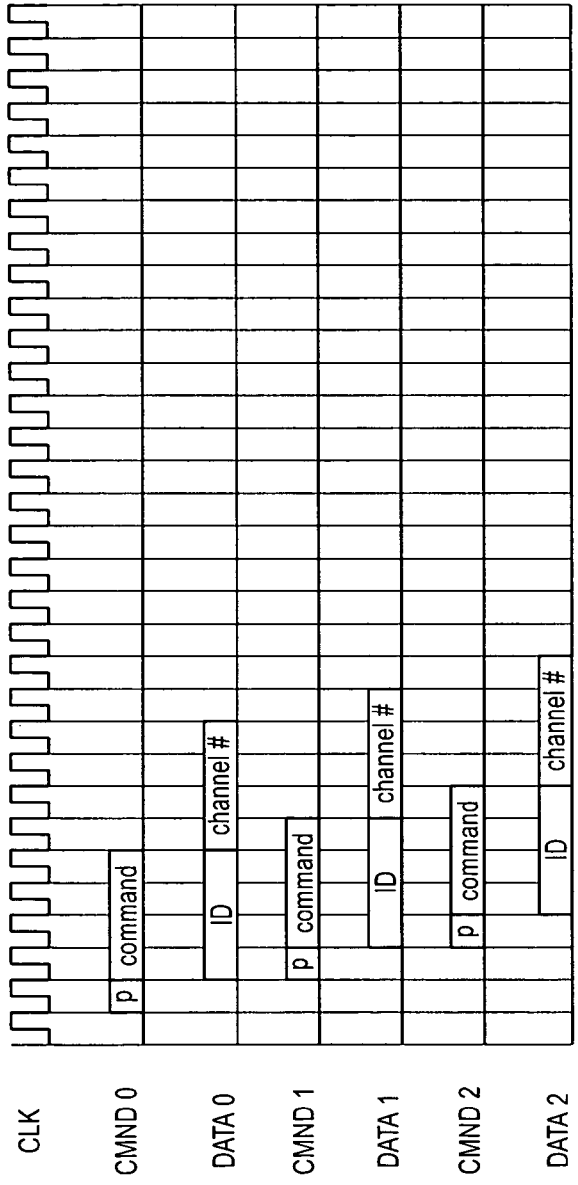
FIG._6F

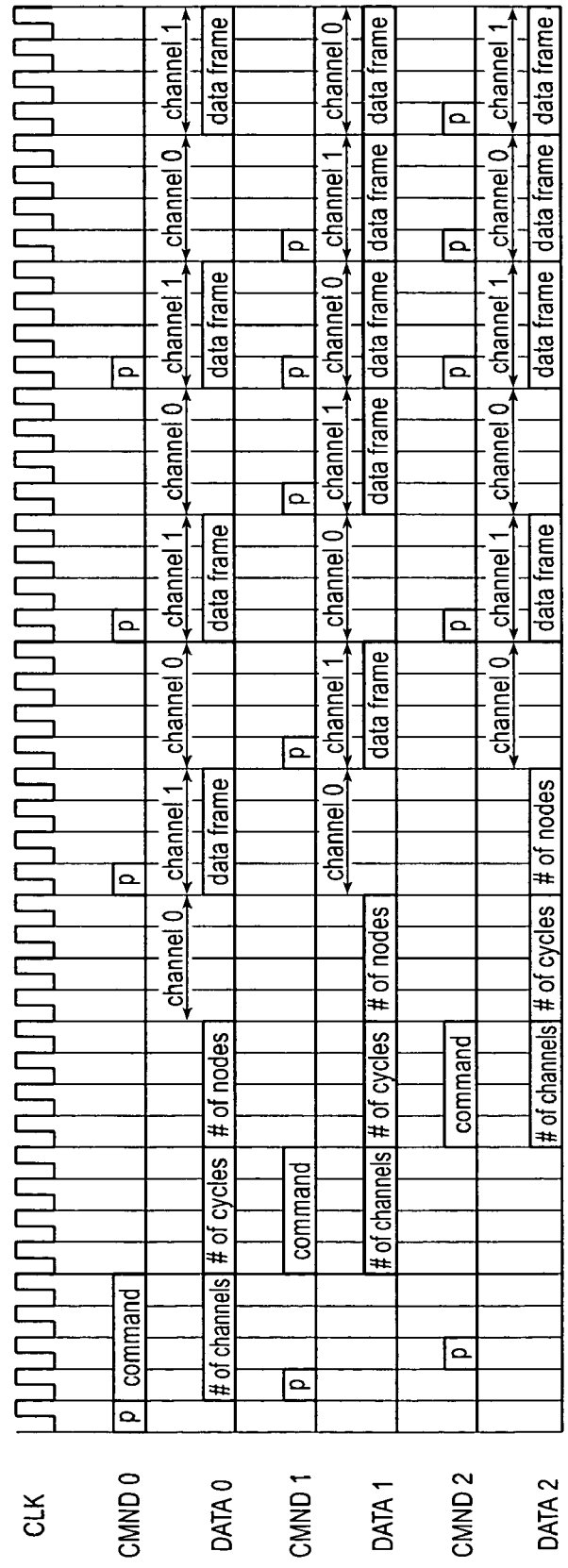

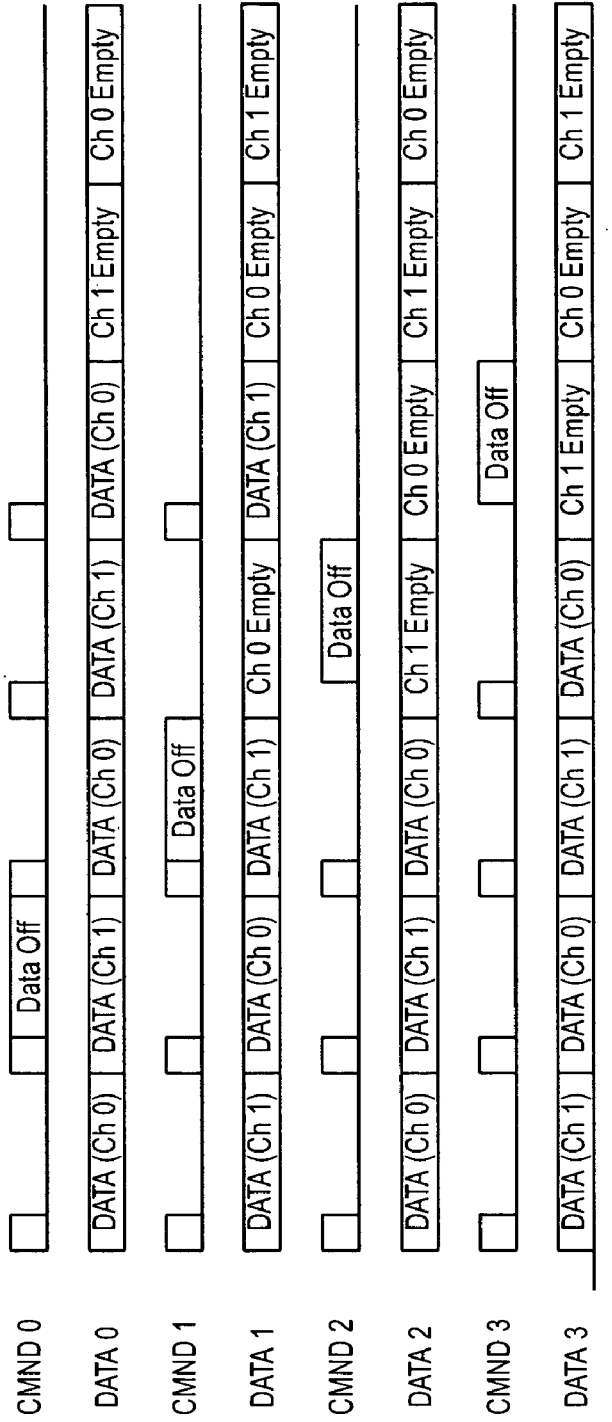
FIG._6I

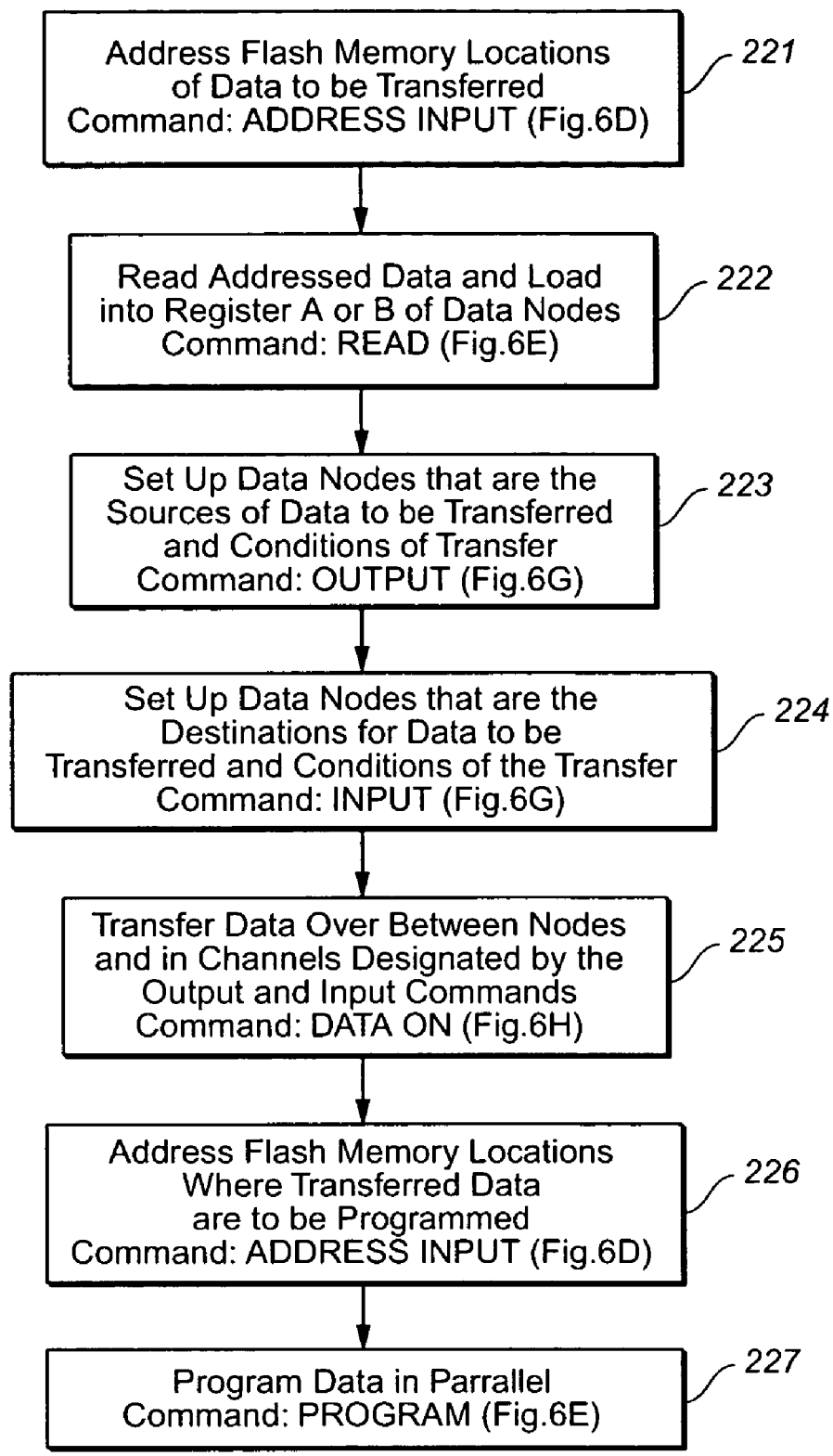
FIG._7

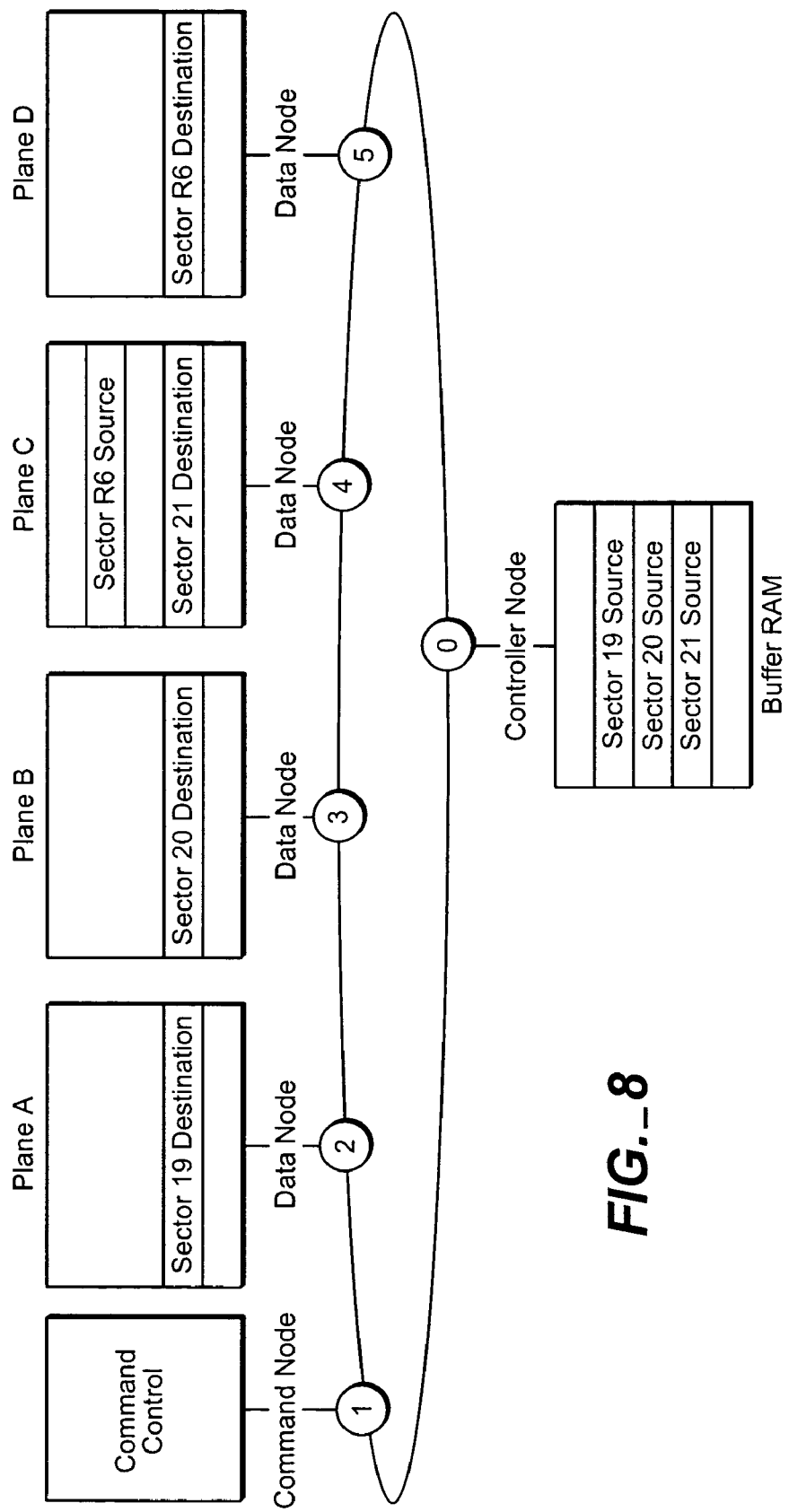
*FIG._8*

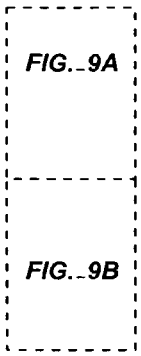

| # | Command | Node ID | Chan # | Address | Reg | Description |
|---|---|---|---|---|---|---|
|  | Set ID |  |  |  |  | Sets Node IDs After Power Up |
|  | - |  |  |  |  |  |
| 1 | Reset Channels |  |  |  |  | Resets All Channel IDs from Previous Operations |
| 2 | Address Input | 1 |  | Sector R6 Source |  | Loads Address for Following Read Command |
| 3 | Read | 1 |  |  | A | Reads Sector R6 from Flash Array to Register A at Node 4 |
| 4 | Status Read | 1 | 0 |  |  | Selects Status Read Operation, with Status Information Being Output on Channel 0 |
| 5 | Input | 2 | 1 |  | A | Selects Data Input Operation, for Sector 19 to be Input from Controller on Channel 1 |
| 6 | Input | 3 | 2 |  | A | Selects Data Input Operation, for Sector 20 to be Input from Controller on Channel 2 |
| 7 | Input | 4 | 3 |  | B | Selects Data Input Operation, for Sector 21 to be Input from Controller on Channel 3 |
| 8 | Data On |  |  |  |  | Initiates Transfer of Sector Data on Channels 1, 2, & 3 |
| 9 | Data Off |  |  |  |  | Suspends Data Transfer |
| 10 | End | 1 |  |  |  | Used When Ready Status Detected, to Terminate Status Read Operation |
| 11 | Output | 4 | 0 |  | A | Selects Data Output Operation, for Sector R6 to be Output on Channel 0 |
| 12 | Input | 5 | 0 |  | A | Selects Data Input Operation, for Sector R6 to be Input from Node 4 on Channel 0 |
| 13 | Data On |  |  |  |  | Initiates Transfer of Sector Data on Channel 0, and Resumes Transfer of Sector Data on Channels 1, 2, & 3 |

| 14 | Data Off | | | | Suspends Data Transfer |
|---|---|---|---|---|---|
| 15 | Data On | | | | Changes to Single Channel Transfer When Transfers on Channels 1, 2, & 3 is Complete, for Increased Transfer Speed |
| 16 | Address Input | 1 | | Sector 19 Destination | When Data Transfer on Channel 0 is Complete, Loads Address for Following Program Command |
| 17 | Address Input | 1 | | Sector 20 Destination | Loads Address for Following Program Command |
| 18 | Address Input | 1 | | Sector 21 Destination | Loads Address for Following Program Command |
| 19 | Address Input | 1 | | Sector R6 Destination | Loads Address for Following Program Command |
| 20 | Multi Block Program | 1 | | | Initiates Parallel Programming of Four Sectors |
| 21 | Status Read | 1 | 0 | | Selects Status Read Operation, with Status Information Being Output on Channel 0 |

FIG._9B

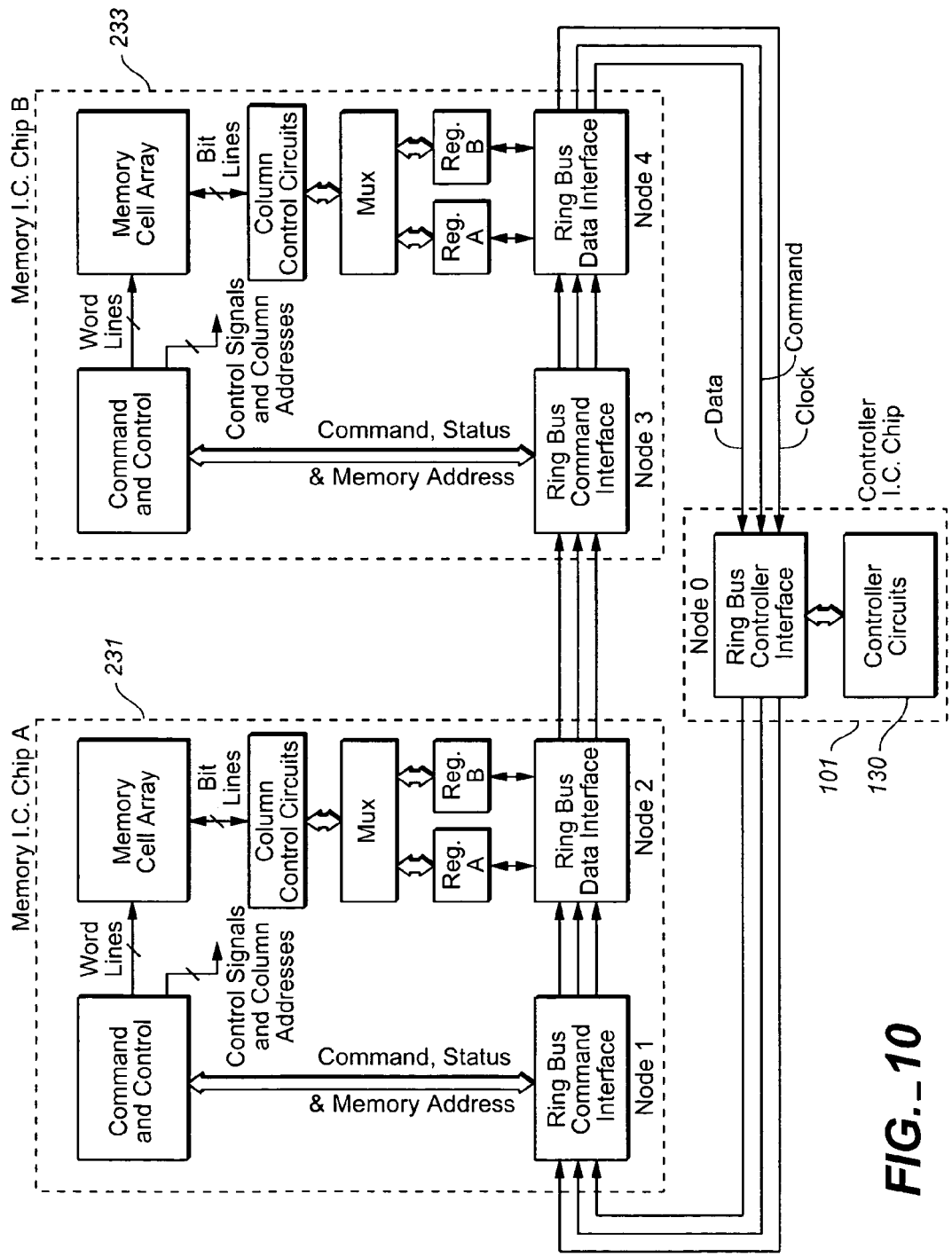
FIG._10

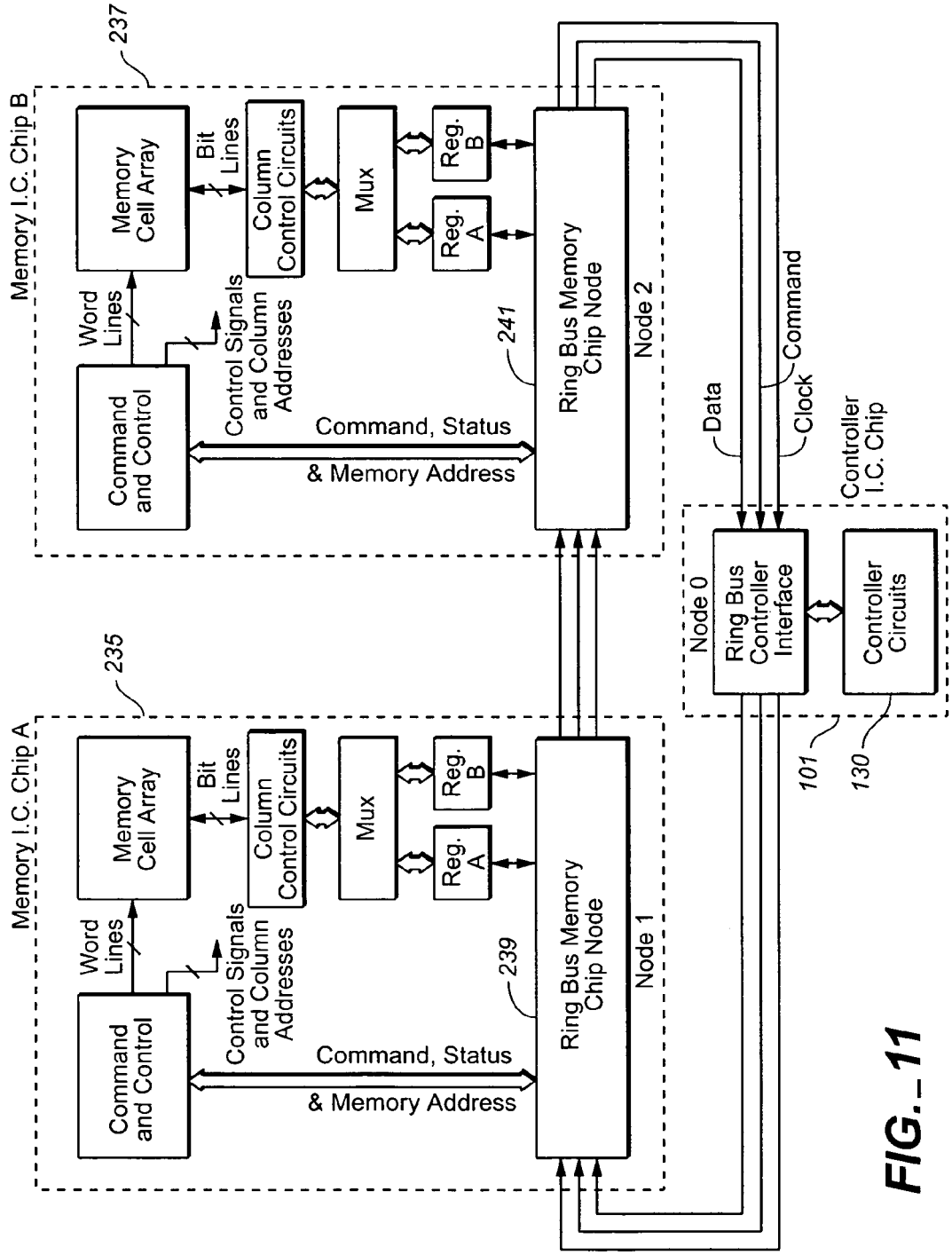
FIG._11

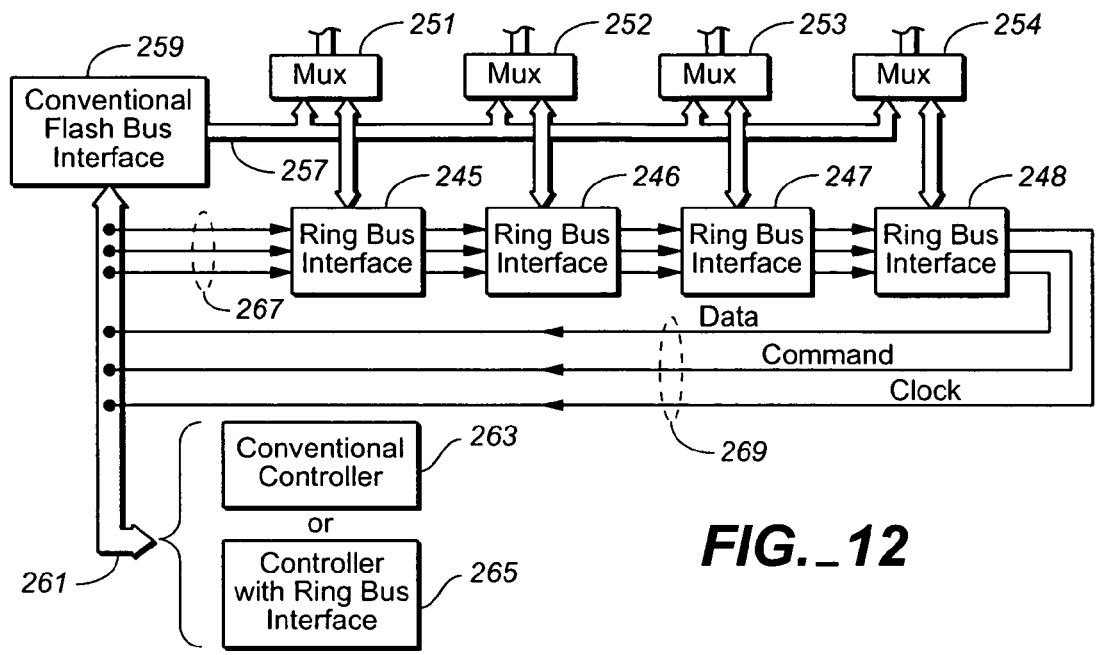
FIG._12
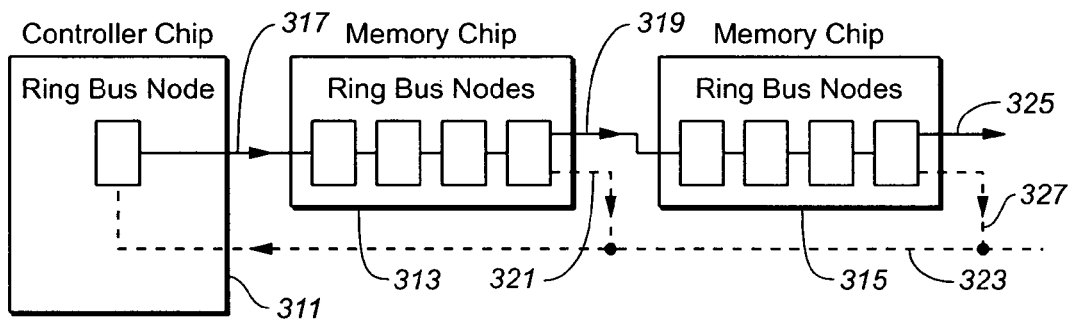
FIG._14
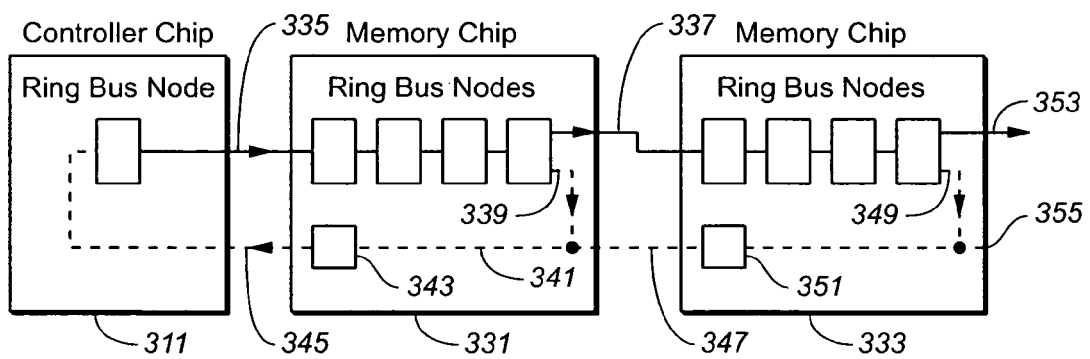
FIG._15

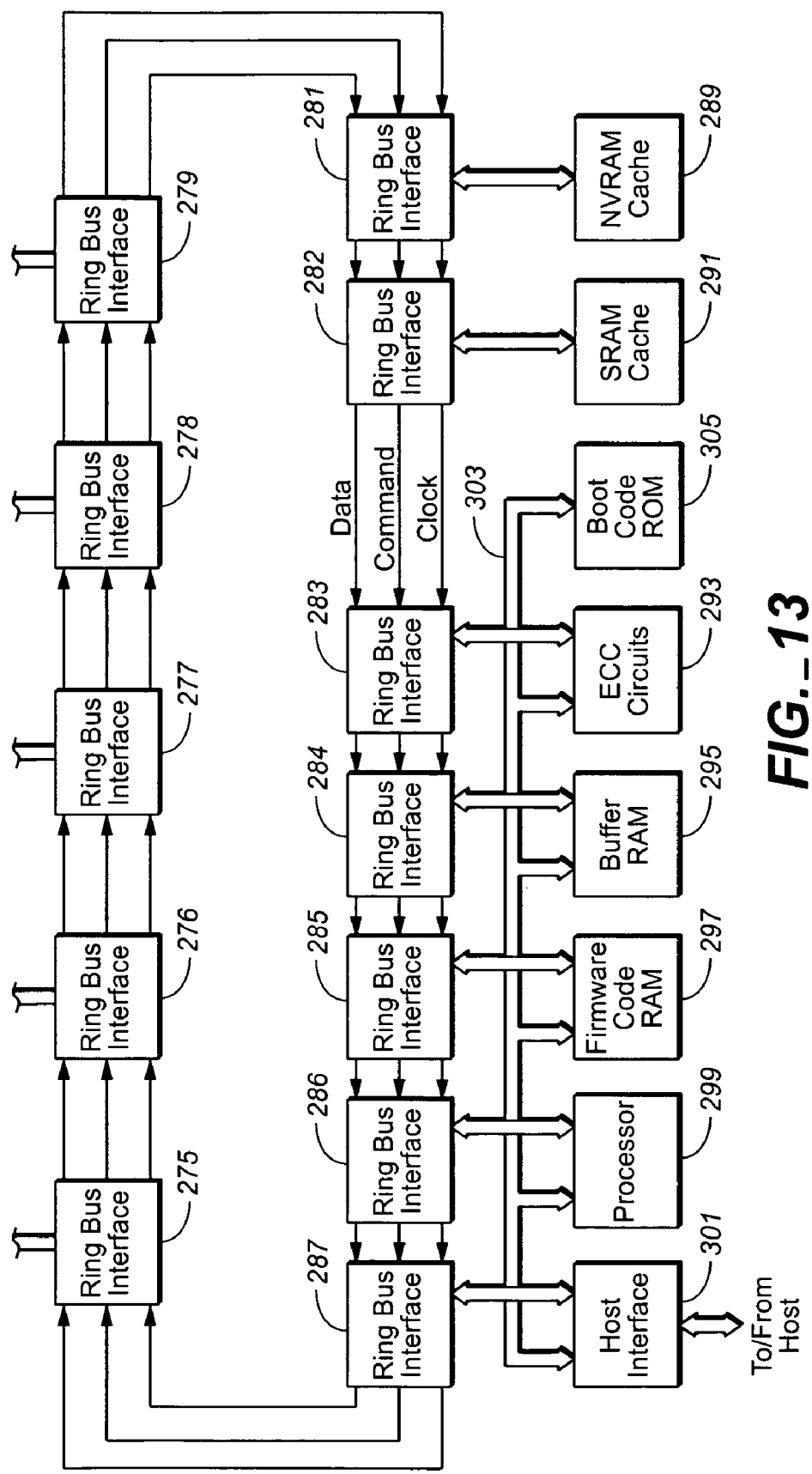
FIG._13

RING BUS STRUCTURE AND ITS USE IN FLASH MEMORY SYSTEMS

BACKGROUND

The present invention relates generally to bus structures and their operation in electronic systems to communicate between components of such systems, and, more specifically, to the use of a ring bus to do so, particularly in flash memory systems.

There are many commercially successful re-programmable non-volatile memory products being used today, particularly in the form of small form factor cards, which employ an array of flash EEPROM (Electrically Erasable and Programmable Read Only Memory) cells formed on one or more integrated circuit chips. A memory controller, usually but not necessarily on a separate integrated circuit chip, interfaces with a host to which the card is removably connected and controls operation of the memory array within the card. Such a controller typically includes a microprocessor, some non-volatile read-only-memory (ROM), a volatile random-access-memory (RAM) and one or more special circuits such as one that calculates an error-correction-code (ECC) from data as they pass through the controller during programming and reading.

Some of the commercially available cards that utilize flash memory are the CompactFlash™ (CF) card, MultiMedia card (MMC), Secure Digital (SD) card, miniSD card, SmartMedia card, xD-Picture card, TransFlash card and Memory Stick card. Hosts include personal computers, notebook computers, personal digital assistants (PDAs), various data communication devices, digital cameras, cellular telephones, portable audio players, automobile sound systems, and similar types of equipment. Many hosts have one or more slots to receive one or more of the commercial memory card types, and/or can connect to a card reader through a Universal Serial Bus (USB) receptacle or the like. USB flash drives are also available that plug directly into a USB receptacle of a host to connect the host to the memory within the drives. Besides the memory card and flash drive implementations, flash memory systems can alternatively be embedded into various types of host systems. These and additional flash memory products are available from SanDisk Corporation, assignee of the present patent application.

Two general memory cell array architectures have primarily been implemented commercially, NOR and NAND. In a typical NOR array, memory cells are connected between adjacent bit line source and drain diffusions that extend in a column direction with control gates connected to word lines extending along rows of cells. A memory cell includes at least one storage element positioned over at least a portion of the cell channel region between the source and drain. A programmed level of charge on the storage elements thus controls an operating characteristic of the cells, which can then be read by applying appropriate voltages to the addressed memory cells. Examples of such cells, their uses in memory systems and methods of manufacturing them are given in U.S. Pat. Nos. 5,070,032, 5,095,344, 5,313,421, 5,315,541, 5,343,063, 5,661,053 and 6,222,762.

The NAND array utilizes series strings of more than two memory cells, such as 16 or 32, connected along with one or more select transistors between individual bit lines and a reference potential to form columns of cells. Word lines extend across cells within a large number of these columns. An individual cell within a column is read and verified during programming by causing the remaining cells in the string to be turned on hard so that the current flowing through a string is dependent upon the level of charge stored in the addressed cell. Examples of NAND architectural arrays and their operation as part of a memory system are found in U.S. Pat. Nos. 5,570,315, 5,774,397, 6,046,935, 6,522,580 and U.S. patent application publication No. 2003/014278.

The charge storage elements of current flash EEPROM arrays, as discussed in the foregoing referenced patents, are most commonly electrically conductive floating gates. An alternate type of memory cell useful in flash EEPROM systems utilizes a non-conductive dielectric material in place of the conductive floating gate to store charge in a non-volatile manner. Several specific cell structures and arrays employing dielectric storage elements are described by Harari et al. in U.S. patent application publication No. 2003/0109093.

As in most all integrated circuit applications, the pressure to shrink the silicon substrate area required to implement some integrated circuit function also exists with flash memory cell arrays. It is continually desired to increase the amount of digital data that can be stored in a given area of a silicon substrate, in order to increase the storage capacity of a given size memory card and other types of packages, or to both increase capacity and decrease size. One way to increase the storage density of data is to store more than one bit of data per memory cell and/or per storage unit or element. This is accomplished by dividing a window of a storage element charge level voltage range into more than two states. The use of four such states allows each cell to store two bits of data, eight states stores three bits of data per storage element, and so on. Multiple state flash EEPROM structures using floating gates and their operation are described in U.S. Pat. Nos. 5,043,940 and 5,172,338, and for structures using dielectric floating gates in aforementioned U.S. patent application publication No. 2003/0109093. Selected portions of a multi-state memory cell array may also be operated in two states (binary) for various reasons, in a manner described in U.S. Pat. Nos. 5,930,167 and 6,456,528.

Flash memory cells are erased prior to re-programming. Memory cells of a typical flash memory cell array are divided into discrete blocks of cells that are erased together. That is, the block is the erase unit, a minimum number of cells that are simultaneously erasable. Each block typically stores one or more pages of data, the page being the minimum unit of programming and reading, although more than one page may be programmed or read in parallel in different sub-arrays or planes of memory cells. Each page typically stores one or more sectors of data, the size of the sector being defined by the host system. An example sector includes 512 bytes of user data, following a standard established with magnetic disk drives, plus some number of bytes of overhead information about the user data and/or the block in which they are stored. Such memories are typically configured with 16, 32 or more pages within each block, and each page stores one or more host sectors of data.

In order to increase the degree of parallelism during programming user data into the memory array and read user data from it, the array is typically divided into sub-arrays, commonly referred to as planes, which contain their own data registers and other circuits to allow parallel operation such that sectors of data may be programmed to or read from each of several or all the planes simultaneously. An array on a single integrated circuit may be physically divided into planes, or each plane may be formed from a separate one or more integrated circuit chips. Examples of such a memory implementation are described in U.S. Pat. Nos. 5,798,968 and 5,890,192.

To further efficiently manage the memory, blocks may be linked together to form virtual blocks or metablocks. That is, each metablock is defined to include one block from each of several or all of the planes. Use of the metablock is described in U.S. patent application publication No. 2002/0099904. The metablock is identified by a host logical block address as a destination for programming and reading data. Similarly, all blocks of a metablock are typically erased together.

The controller in a memory system operated with such large blocks and/or metablocks performs a number of functions imposed upon it by the host and in order to maintain efficient operation. Repetitive data consolidation ("garbage collection") is performed in order to efficiently utilize the storage capacity of the memory. The controller typically suspends its primary function of transferring data into and out of the memory when performing garbage collection, thus potentially adversely affecting system performance. Some limited copying of data on the memory array chips themselves is disclosed in U.S. Pat. No. 6,266,273.

A typical flash memory system includes one or more integrated circuit chips that each contains an array of memory cells and associated peripheral circuitry, and another integrated circuit chip containing the controller. For some applications, a controller and a memory array are included on a single chip. In either case, data, addresses, commands and status information are communicated between the controller and one or more flash memory cell arrays, sub-arrays, planes or integrated circuit chips over a common bi-directional system bus to which all of the memory system components are operably connected.

SUMMARY OF THE INVENTION

The operating speed of flash memory systems is being restricted by the use of such a bus. Since the single bus is rather long, the system operating frequency is limited by round trip delays and a large capacitive load inherent in the bus. Communication may be had over the bus only between the controller and one of the flash memory chips. When the bus is busy transmitting one unit of data between certain locations of the system, no other component of the system may use the bus for data transfer. Data are usually not transferred directly between separate units of memory cells (i.e., between separate arrays, sub-arrays, planes or chips). Rather, such data transfers typically include passing the data over the common bus to the controller for temporary storage in a buffer memory as part of the transfer.

Therefore, in the improvement to the conventional bus that is described herein, the controller and all memory cell arrays, sub-arrays, planes and integrated circuit chips of the memory system are connected through individual bus interface circuits (nodes) to each other in a loop or ring. The segments of the ring bus between nodes are individually driven, thereby significantly reducing the amount of capacitance of each driven segment and thus increasing the allowable bus operating frequency. Data can be communicated directly between memory cell arrays, sub-arrays, planes and chips, as well as between any of them and the controller. But the data being communicated need not necessarily first go through the controller. The bus preferably forms a closed loop and data, commands and status information transferred in a single direction around the loop. Data is preferably transferred completely around the ring to the node where it originated, at which point the validity of the data after the transfer may optionally be checked. The ring bus described herein can be substituted for the convention bus used in prior memory systems such as those described in the Background above.

In a preferred implementation, a single master node, typically that of the system controller, controls operation of all other nodes connected by the ring bus. Specific commands issued by the controller are addressed to one or more nodes by an appended node address that causes the command to be acted upon by only the addressed nodes. Global commands, such as initialization and configuration commands, are accepted by all nodes. Prior to data being transferred around the bus among the nodes, the nodes are set up to accommodate the specific transfer. For example, if data are to be transferred from one memory unit (a chip, sub-array or plane, for example) to another, the data are read from the source unit to a register connected to its node and the destination node is configured to receive the data. A subsequent transfer command then causes the planned transfers to take place between the source and destination nodes that have been conditioned by the commands. An advantage of this system and operation is the ability to make such transfers of data directly between units of the memory, as well as between units of the memory and the controller node.

Another feature that may be included in the operation of the ring bus is time division multiplexing. That is, data are transferred around the bus in assigned time slots or frames. Multiple frames of data can thus be transferred concurrently. The number of time slots employed is preferably dynamically adjusted to equal the number of frames of data that are being transferred concurrently. The data frames need not all have the same source or destination nodes around the ring. The data bandwidth requirements of a memory system component connected with a bus node need then not be as high as the bus since data are transferred to or from a particular component at its individual frame rate, which is a fraction of the data transmission rate of the ring bus. In a specific example, commands used to set up the nodes for data transfer are transmitted around the bus without time division multiplexing but with addresses of the intended nodes attached. The planned data transfer then takes place by use of multiple time slots. Status information may also be communicated around the bus by use of one of the time slots.

As a further feature, the integrity of the data read from the memory may easily be checked by passing it through an error correction function typically provided by the controller, most conveniently by a circuit dedicated to executing an error correction code (ECC). If the data are transferred completely around the ring, as is preferred, they will always pass through the controller node, no matter where the source and destination nodes are located relative to that of the controller. The node originating the data transfer may optionally also verify the data received after traveling around the bus with the data it placed on the bus, in order to assure that the data were not corrupted by the transmission.

As a yet another feature, various functions and components of the controller may also be individually connected through nodes to the system ring bus, including the processor, buffer memory and ECC circuitry. The flexibility and parallelism of node-to-node command and data transfers are then further increased. A conventional controller bus may also be included for the transfer of commands and data directly among the controller components for its efficient operation when other components of the memory system are not involved.

In order to provide backward compatibility with existing conventional controllers, the memory cell array integrated circuit chips may have an interface for connection with a conventional bus through which the ring bus described above is also connectable when a controller adapted to use the ring bus is used. This dual mode bus interface allows the flash memory chip to be used in a memory system with either type of controller.

In one implementation of the integrated circuit memory chip, one or more memory data nodes are connected in series between external input and output bus contacts. One or more memory chips are then connected in series with a controller chip by connecting their bus contacts together to connect them in a closed loop. Multiple memory chips are connected with the bus output of one chip connected to the bus input of another of the memory chips. In order to be able to conveniently manufacture memory cards having different numbers of memory chips with use of a single printed circuit board (PCB), the individual memory chips may be provided with two sets of bus output pads, one for connection with a next in series memory chip and the other for connection to a bus path that returns to the controller chip. The bus return output pads of each memory chip attached to the PCB are then connected to a single set of conductors on the PCB that provide the return bus path to the controller for any number of one to some maximum number of memory chips. The return bus output pads are then enabled in the last of the series of memory chips to operably connect with the return path conductors on the PCB, while the return bus output pads of all other memory chips are disabled. Rather, the other memory chips have their other outputs connected with bus inputs of another of the memory chips to form the series connection of memory chips and the ring bus.

Additional aspects, advantages and features of the present invention are included in the following description of exemplary examples thereof, which description should be taken in conjunction with the accompanying drawings. Various aspects of the present invention can be implemented in a wide variety of types of memory systems that have a need for a high frequency bus to transfer data between its components, implementation in only one type of a flash memory system being described herein to illustrate the invention. Further, many aspects and features of the present invention can be implemented with similar advantages in other types of electronic systems that utilize an internal bus.

All patents, patent applications, articles and other types of publications referenced herein are hereby incorporated herein by this reference in their entirety for all purposes.

BRIEF DESCRIPTION OF THE DRAWINGS

FIG. 1 is a block schematic diagram of a typical existing flash memory system that utilizes a conventional bus architecture;

FIG. 2 is a block schematic diagram of a first embodiment of a flash memory system utilizing a ring bus architecture;

FIGS. 3A, 3B and 3C are timing diagrams that illustrate different aspects of time division multiplex operation of the ring bus of the system of FIG. 2;

FIG. 4 is a circuit schematic diagram of the ring bus data interface blocks of the system of FIG. 2;

FIG. 5 is a circuit schematic diagram of the ring bus command interface block of the system of FIG. 2;

FIGS. 6A-6I show eight different commands, and one alternative, along with illustrating their uses in the ring bus system of FIG. 2;

FIG. 7 is a flow chart that illustrates operation of the ring bus system of FIG. 2 by using the commands of FIGS. 6A-6I;

FIG. 8 illustrates an example of a specific data transfer in the system of FIG. 2;

FIG. 9 lists a sequence of commands the identified in FIGS. 6A-6I to carry out the example data transfer illustrated in FIG. 8;

FIG. 10 is a block schematic diagram of a second embodiment of a flash memory system utilizing a ring bus architecture;

FIG. 11 is a block schematic diagram of a third embodiment of a flash memory system utilizing a ring bus architecture;

FIG. 12 is a block schematic diagram of a fourth embodiment of a flash memory system utilizing a ring bus architecture;

FIG. 13 is a block schematic diagram of a fifth embodiment of a flash memory system utilizing a ring bus architecture;

FIG. 14 is a block schematic diagram of a sixth embodiment of a flash memory system utilizing a ring bus architecture; and FIG. 15 is a block schematic diagram of a seventh embodiment of a flash memory system utilizing a ring bus architecture.

BACKGROUND DESCRIPTION OF A CONVENTIONAL BUS SYSTEM

Figure 6G:
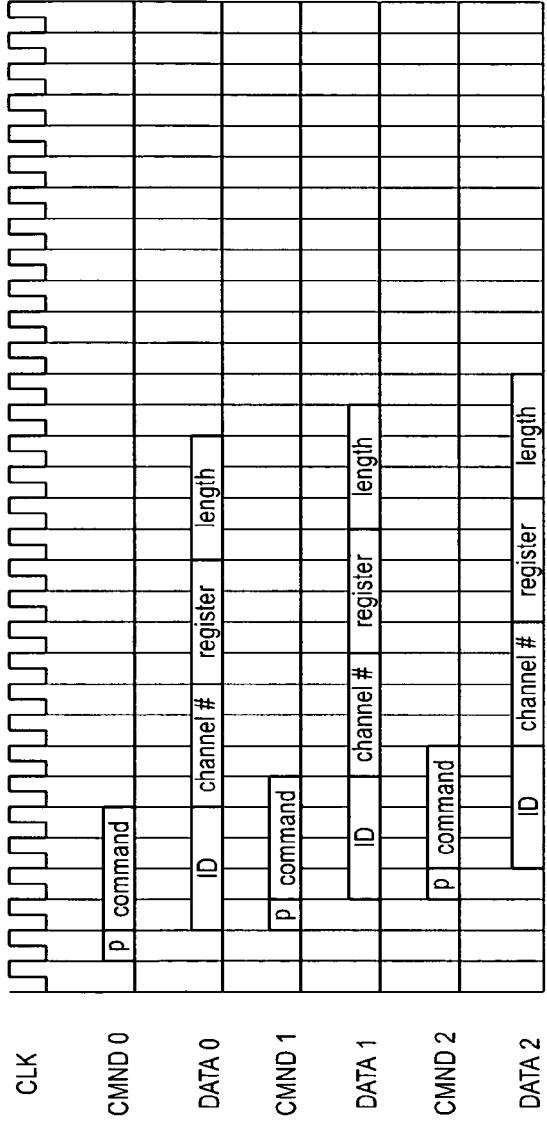

Referring to FIG. 1, a typical flash memory system with a conventional bus is illustrated to provide a background for the subsequent description of the various aspects and features of the present invention. The system controller is usually implemented on a single integrated circuit chip 11 that is connected in parallel with one or more integrated circuit memory chips over a system bus 13, a single such memory chip 15 being shown in FIG. 1. The particular bus 13 that is illustrated includes a separate set of conductors 17 to carry data, a set 19 for memory addresses and a set 21 for control and status signals. Alternatively, a single set of conductors may be time shared between these three functions.

A typical controller chip 11 has its own internal conventional bus 23 that interfaces with the system bus 13 through interface circuits 25. The primary functions normally connected to the bus are a processor 27 (such as a microprocessor or micro-controller), a read-only-memory (ROM) 29 containing code to initialize ("boot") the system, read-only-memory (RAM) 31 used primarily to buffer data being transferred between the memory and a host, and circuits 33 that calculate and check an error correction code ("ECC") for data passing through the controller between the memory and the host. The controller bus 23 interfaces with a host system through circuits 35, which, in the case of the system of FIG. 1 being contained within a memory card, is done through external contacts 37 of the card. A clock 39 is connected with and utilized by each of the other components of the controller 11.

The memory chip 15, as well as any other connected with the system bus 13, typically contains an array of memory cells organized into multiple sub-arrays or planes, two such planes 41 and 43 being illustrated for simplicity but four or eight such planes are more typical. Alternatively, the memory chip 15 may include a memory cell array that is not divided into planes. When so divided however, each plane has its own column control circuits 45 and 47 that are operable independently of each other. The circuits 45 and 47 receive addresses of their respective memory cell array from the address portion 19 of the system bus 13, and decode them to address a specific one or more of respective bit lines 49 and 51. The planes 41 and 43 have common word lines 53 that are addressed through row control circuits 55 in response to addresses received on the address bus 19. A NAND architecture of the memory cell arrays 41 and 43 is currently preferred. Source voltage control circuits 57 and 59 are also connected with the respective planes, as are p-well voltage control circuits 61 and 63.

Data are transferred into and out of the planes 41 and 43 through respective data input/output circuits 65 and 67 that are connected with the data portion 17 of the system bus 13. The circuits 65 and 67 provide for both programming data into the memory cells and for reading data from the memory cells of their respective planes, through lines 69 and 71 connected to the planes through respective column control circuits 45 and 47.

Although the controller 11 controls the operation of the memory chip 15 to program data, read data, erase and attend to various housekeeping matters, each memory chip also contains some controlling circuitry that executes commands from the controller 11 to perform such functions. Interface circuits 73 are connected to the control and status portion 21 of the system bus 13. Commands from the controller are provided to a state machine 75 that then provides specific control of other circuits in order to execute these commands. Control lines 77-81 connect the state machine 75 with these other circuits as shown in FIG. 1. Status information from the state machine 75 is communicated over lines 83 to the interface 73 for transmission to the controller 11 over the bus portion 21.

It can be seen from the memory system of FIG. 1 that communication between the controller chip 11 and various parts of the memory chip 15 are dependent upon limitations of communication over a single system bus 13 to which the controller and memory chips are connected in parallel.

DETAILED DESCRIPTION OF EXEMPLARY RING BUS EMBODIMENTS

A first embodiment of a memory system using a ring bus instead of the conventional bus 15 described above is illustrated in FIGS. 2-9. Referring initially to FIG. 2, a controller integrated circuit chip 101 and a single memory chip 103 form the memory system but additional memory chips can also be included. The memory chip 103 is illustrated to have four planes 105-108 of memory cells but fewer, even one, or more than four memory planes may be used instead. Column control circuits 110-113 are connected to the respective planes 105-108. Data are programmed into and read from the memory planes 105-108 through respective multiplexing circuits 115-118 that selects one of two data registers A or B. During data programming, data stored in one of the registers A or B of a particular plane that is selected by its multiplexer is programmed into that plane. Similarly, during data reading, data read from a plane is written into one of the registers A or B selected by its multiplexer. Use of these two registers is not required, a single register could be used instead, but they add a degree of flexibility and parallelism in the operation of the memory system. Command and control circuits 121 provide functions similar to the state machine 75 and various ones of the control circuits of the system of FIG. 1.

In the example of FIG. 2, each of the memory array planes 105-108 communicates data read from the plane or to be programmed into the plane through a respective one of ring bus interface nodes 123-126. Both of the data registers A and B of each plane are connected with the node for that plane. Commands from the controller 101 are received by a ring bus interface node 127 and status signals are sent back to the controller through that same node. The node 127 is connected with the control circuits 121 of the memory integrated circuit chip 103. If additional memory chips are included in the system (not shown in FIG. 2), each will have its own command interface node, in this specific example.

Similarly, the controller chip 101 includes a ring bus node 128 that is connected with a controller 130. The controller 130 of FIG. 2 can be similar to the controller 11 of FIG. 1, except that the node interface 128 (FIG. 2) replaces the memory interface 25.

The nodes 123-128 are connected together in a loop in order to transfer data, addresses, commands and status information between them. That loop is formed by a ring bus having one line 133 carrying data and another line 135 carrying commands from the controller 130. Alternatively, two or more data lines can be used and/or two or more command lines can be included in the ring bus in order to increase the information transfer bandwidth but this comes at the expense of more complex bus node circuitry and operation. Another line 137 may be included in the bus to carry the clock signal to the nodes. Alternatively, the clock line may be omitted if a self-timed format is adopted for information on the data line 133 and on the command line 135.

The system of FIG. 2 is operated to transfer data and commands on the ring bus in a pipelined manner, with a delay of one or only a few clock cycles preferably introduced at each node. The data line 133, command line 135 and clock line 137 follow identical paths on the integrated circuit chips 101 and 103, and between them, and the same delays are introduced in each node to signals in the three lines. Information is only transferred from point-to-point along segments of the bus between adjacent nodes, rather than existing on the entire bus as occurs with a conventional bus, thereby making very high frequency operation of the ring bus possible. The signals on the bus may be fully digital with their amplitude set by the available power supply voltage. However, a higher operating frequency and reduced power dissipation may be achieved by utilizing an appropriate high speed signaling technique instead, such as low voltage swing signaling, fully differential signaling, pseudo-differential signaling, double data rate or the use of current mode drivers.

It is preferred that commands originate only in the controller node 128, which makes it the single master on the ring bus. Command codes are communicated from the controller node 128 on the command line 135 for execution by one or more of the other nodes 123-127. When only a single node is targeted for execution of a command, a corresponding identification code of the node is transmitted on the data line 133 at the same time. The targeted node is then the only node that accepts the command for execution.

Data transferred on the data line 133 may originate in any one of the nodes 123-128 (source node) and be directed to any one or more of the other nodes (destination nodes). Prior to such data transfer, the source and destination nodes are configured for it. Transfer of the data around the ring bus then takes place. The data being transferred preferably travels around the entire ring bus and back to the originating mode. This assures that the transferred data can be read by any of the other nodes that are configured to do so, such as a node that checks the validity of the data by use of an ECC. This also makes it possible for the originating node to check the received data for errors occurring during transmission around the ring bus, such as by a comparison with the original transmitted data or with use of redundant parity bits.

In one specific operation of the system of FIG. 2 that is preferred in most cases, data is transmitted around the ring bus on the data line 133 in frames or time slots, utilizing time division multiplexing. This allows concurrent transfer around the ring bus of two or more different channels of data, such as different data sectors, which may have different source and/or destination nodes. The number of time slots used for each transfer of data is selected to accommodate the number of concurrent data transfers to take place. This fully utilizes the bandwidth of the ring bus while allowing certain functions of the individual nodes to operate with a lesser bandwidth, as well as the memory data programming and writing circuitry connected with individual nodes.

Referring to the timing diagram of FIG. 3A, time multiplexed data transmission of three channels 0-2 concurrently is illustrated. A single cycle "pip" is transmitted on the command line 135 as a marker to indicate that a frame then beginning on the data line 133 contains valid data. A pip is most commonly inserted on the command line 135 by any of the nodes that is the source of data being inserted in a time frame on the data line 133 that begins during the same clock cycle as the pip. The data line 133 and command line 135 of the ring bus thus should be routed similarly and operated synchronously. The timing and definition of the data time slots are controlled in a manner described below that does not utilize the pips to do so.

Data frames A, B and C, in the example of FIG. 3A, are transmitted in channels 0, 1 and 2, respectively. Channel 1 does not carry valid data for two cycles, after which time the initial data frame B becomes available for transfer over the ring bus. One channel of data may be transferred in this manner between any of the memory frame nodes 123-127, thereby transferring data between planes within the memory chip 103 without having to go through the controller 130, or between one or more of them and the controller node 128, when data are being transferred between the memory and a host system.

Two specific implementations of time division multiplexing for transferring data around a ring bus having D number of nodes are conceptually illustrated by the timing diagrams of FIGS. 3B and 3C. The duration (length) of each time frame is A clock cycles. While the data bus time slots of specific examples described below are four clock cycles, the number A can be as few as one and up to 8, 16, 32 or more. A delay of the data by a node through which it passes is indicated as B clock cycles. Each of the parameters A and B will usually be designed into the memory system, so will therefore not be changeable during operation of the system. A number C of time slots are being used.

In the ring bus operation illustrated in FIG. 3B, the number C of channels (time slots) is made equal to the number D of nodes on the bus. The frame length A is also made to be equal to the bus delay B between nodes, both measured in numbers of clock cycles. Each node stores a number of bits passing through it that is equal to the delay B, typically by having B storage register stages. Use of these parameters allows data to be simultaneously transferred to each data node on the bus. There is one storage register around the bus for each data bit position in the all the time slots. This causes the C allocated data time slots to cycle continuously through each node. The maximum number of channels that can be used for typical data transfer operations then exists. Indeed, since a channel is included for each control node that will usually not be receiving or transmitting data, one or more extra channels result. These can be used to send status information back to the controller. One channel is usually used to send status information for each memory chip in the system.

However, although convenient to implement time division multiplexing in the manner shown in FIG. 3B, this maximum number of data channels are seldom necessary. It is therefore preferable to use as few time slots C as needed for any specific data transfer operation in order to make maximum use the data bus bandwidth. The timing diagram of FIG. 3C illustrates operation of the bus with a dynamically selected number C of channels, which can be made to be what is necessary for a given data transfer but need not contain the many empty time slots as can occur when operating as shown in FIG. 3B.

In FIG. 3C, a case is illustrated where a lesser number of channels C than the number D of nodes on the bus are being used. In this example, sequential frames of data from a node are being circulated around the ring bus in at least two time slots with the same channel identity at the same time. For example, if there are D=12 nodes on the bus and the multiplexing has dynamically designated C=6 channels of data to be transferred at the same time, each channel appears twice around the bus. This is relatively straightforward since D/C is an integer, in this example, that integer being equal to 2. But the more frequent case is shown in FIG. 3C where D/C is not an integer. In such a case, one or more unused time slots are inserted, an unused time slot being referenced as a "nul slot." A number of nul slots are inserted so that the number of nodes D minus the number of nul slots, when divided by the number of time slots C, is an integer. That is, (D−[nul slots])/C is made to equal an integer.

A sequence of all C frames (time slots) of data being transferred over the data bus is designated in FIG. 3C to form one "cycle." A whole number N of cycles are caused to repeat in order to form a group of time slots around the bus that are, in this example, less than the number D of nodes on the bus through which the data are passed. In order to make the sequence of time slots equal to the number of nodes D, a Nul slot is added to, in effect, extend the group to N cycles plus the nul slot. In the example of FIG. 3C, N=D−1, and compensation for that missing 1 is accomplished by insertion of the nul slot where shown. In another case where N=D−2, for example, two nul slots are inserted. This makes the total number of clock cycles necessary to move data of the group completely around the bus one time equal to the total number of one-bit storage locations around the ring. The quantities N and C are chosen for a given data transfer operation to minimize the number of unused nul slots that are circulated around the ring, since their use decreases the data transfer bandwidth of the bus somewhat. The Nul slot, when necessary, has no data channel associated with it and it circulates continuously from node-to-node around the ring. Nul data, having "don't care" values, are passed from node-to-node in the nul slot.

An example circuit implementation for each of the data nodes 123-126 of FIG. 2 is shown in FIG. 4. A signal of a bit of data on the data line 133 of the ring bus is received by a register stage 151 and shifted through successive registers 152, 154 and 156 in series. Four register stages are illustrated to match a time slot length A of four clock cycles. The outputs of the last stage 156, and of the first stage 151, are both connected as inputs to a switching circuit 153. This allows the circuit 153 to operate with either one or four cycles of delay. An output of the switching circuit 153 is connected back to the data line 133 through a driver 155. When the switching circuit 153 has its input from the register 156 connected to its output driver 155, the most common configuration, a bit of data received by the register 151 of a data node is placed back on the data line 133 four clock cycles later for transmission to the next data node over another segment of the ring bus. Similarly, when the switching circuit 153 has its input from the register 151 connected to its output driver 155, the delay is one clock cycle. The switching circuit 153 will not have either of these data bus inputs connected to its output during a time slot in which data are being placed on the data line by the node from one of its registers A or B.

If the data bus uses two or more parallel data lines, rather than the single line illustrated, separate register stage(s) are provided for each line and the switching circuits 153 switch them together. For example, if the data bus contains four lines, the data node includes a single register stage in each line. In such a case, the total delay for each node to transfer four bits of one time slot through it is a single clock cycle instead of four cycles. Although this beneficially increases the bandwidth of the bus, the circuitry and operation of the system are more complicated.

The command line 135 input to the data node is similarly connected to another series of four registers 157, 158, 160 and 162. Commands are routed on the command line 135 in synchronism with data on the data line 133, namely with the same delays imposed. The output of the last register 162 is connected to the switching circuit 153, as is the output of the first register stage 158, similar to the data register path. Either of these inputs may be connected by the switching circuit 153 to a driver 159 for placing the command information onto the next segment of the ring bus with a delay of either one or four clock cycles. Neither of these inputs is connected to the driver 159 when the node needs to place a pip onto the command line 135, which it does to indicate that valid data are being placed on the data bus 133 by the node in the time slot then occurring. If the data bus contains two or more lines, the command bus is preferably constructed similarly, including the use of parallel registers, so that the two buses operate in synchronism.

The clock signal line 137 is connected directly with a driver 161 and provides clocking for the data and command register stages, as well as a clock signal for the remaining circuits of the data node.

A decoder 163 receives controller commands from the command line 135 at the output of the register 157, and associated data on the data line 133 at the output of the register 151. Among the functions of the decoder is the execution of commands to configure its node to either receive or transmit data in a subsequent data transmission. Data associated with the commands that are supplied on the data line 133 can include the node identification number for which the command is intended, the channel number over which data are to be transmitted or received, whether the register A or B is to be used, the length of the data being transferred, and other configuration information.

A register 165 contains a unique identification number for the node that is stored in it upon power-up or other initialization of the memory system. A global initialization command issued by the system controller preferably accomplishes this. The identification number is used during operation as an address for commands from the controller that are intended for the node. Although all nodes on the ring bus will receive a command, the command is transmitted over the bus with the identification number of the node for which the command is intended. Only the node or nodes addressed with their identification number will therefore respond to store and then execute the command.

Another register 167 contains a number of the channel of the time multiplexed data bus over which the particular node is communicating. This channel number is typically rewritten as part of the configuration of the node prior to each transmission of data to or from the node over the data bus 133. During data transmission, the stored channel number is used to identify occurrences of the time slot of the assigned channel for the node to transmit or receive data. The length of the data to be transferred in a current transfer operation is stored in another register 168, and a designation of which of the registers A or B is being used for the transfer in a register 170. The parameters of the registers 167, 168 and 170 are loaded into them through the decoder 163 by a command send around the bus on the command line 135 that includes the node identification number stored in the register 165.

The switching circuits 153 of FIG. 4 establish a connection between the data bus line 133 and one of the registers A and B (those shown in FIG. 2) through one of respective data lines 169 and 171. The control circuits configure the node to transfer data between one of the registers A or B and the data line 133. When transferring data from the bus for storage in the memory plane of the node, the circuits 153 direct data from the bus line 133 at the output of either the register 151 or the register 156, as selected by a decoded control signal on a line 182, to one of the registers A and B, as selected by a control signal on a line 177. When transferring data in the reverse direction from a selected one of the registers A or B to the data bus line 133 during the time slot assigned to the node, however, the switching circuits 153 connect an output of the selected register to the driver 155 while disconnecting the segment of the data bus line 133 between the register 151 and the driver 155. During other times, the switching circuits 153 are connected to pass data through the node without doing anything with the data, except for imparting the one or four clock cycles of delay. A pass-through connection of the data bus line 133 between either the register 151 or the register 156 and the driver 155 is maintained when the node is not transferring data between one of its data registers A or B and the data bus 133.

Control of the switching circuits 153 to make these connections at appropriate times comes from signals from the decoder 163 over control lines 175-179 and 182, and from an output of a channel counter 181 over other control lines 180. The counter 181 is controlled by the decoder 163 with four signals on lines 183-186. Line 183 carries an initialization signal that resets the counter 181 at the beginning of a data transfer operation with the node. The line 185 carries data of the number of channels being used for the current data transmission, which is communicated by the controller as part of setting up the nodes for the data transfer. The number of nodes D on the bus ring is also supplied to the counter 181 over lines 186, and the number of cycles N (see FIG. 3C) is communicated over circuits 184. The counter 181 counts to the highest channel number and is then reset to the lowest channel number, is paused, begins counting again, and so on. The current count, and thus the current channel number, is input to the switching circuits 153 over lines 180. The circuits 153 compare that number with the channel number that is assigned to the node, provided from the decoder over the control lines 175 from the register 167. When these numbers are the same, the circuits 153 switch the node to receive or transmit data from or to the data bus 133 until the transfer is complete, as determined from the length of the data transmission provided on control lines 176 from the register 168.

A control signal on the lines 177 specifies whether data are being transferred with register A or register B of the node. Lines 178 and 179 carry signals that switch the circuits 153 to (1) receive data from the data bus line 133, in which case the data bus passes through the node and the register identified by the control lines 177 is connected to it, (2) transmit data from the identified register onto the bus line 133 during the time slot assigned to the node, during which time slot the bus line 133 does not pass-through the node, or (3) pass the data bus line 133 through the node without connection with either of the registers A or B.

The data interface node described with respect to FIG. 4 controls data transfer between the bus 133 and the registers A and B. Reading data from the memory cell array plane into the registers A or B for transfer onto the bus 133, or programming data into the memory cell array from the registers A or B that were obtained from the bus 133, are controlled through the command ring bus interface node 127 (FIG. 2). An example of a command node circuit is given in FIG. 5, where elements that are counterparts to those of FIG. 4 are identified by the same reference numbers but have a prime (') added to them. A register 193 stores command data received from the command bus 135 upon being enabled by a control signal in a line 195 from a decoder 197. Similarly, a register 199 stores data received from the data bus 133 when enabled by a signal in line 201 from the decoder. The primary use of the register 199 is to store addresses within the memory cell array(s) that are being accessed for reading or programming.

Data in the registers 193 and 199 are outputted over respective lines 203 and 205, which, along with status signal lines 207, are connected with the memory array control circuits 121 (FIG. 2) over signal path 209. The principle commands carried by lines 203 are those to program and read data to and from one or more of the memory planes 105-108, at locations specified by addresses in the lines 205, and from or into one of the registers A or B. The command codes carried on lines 203 are those specified by the protocol for the command and control circuits 121 (FIG. 2) within the memory chip 103. This protocol need not be identical to that of the command codes used within the ring bus. For example, ring bus command codes may be of a different length from command codes used with the memory cell arrays. In this case, a code translator (not shown) may be incorporated on the output of the command register 193 (FIG. 5). Mapping information, to convert one protocol to the other, may be loaded into the translator by a system configuration command. The status lines 207 provide status signals from the control circuits 121 and through switching circuits 211 to the data bus line 133 in one of the time multiplexed channels designated when setting up the memory system for transferring data between nodes.

The switching circuits 211 of FIG. 5 are simpler in function than the switching circuits 153 of FIG. 4. The data line 133 is passed through between either the register 151' or register 156', as selected by a control signal in lines 214, and the driver 155' at all times except during the time slots that status information from the lines 207 is being placed on the line 133. The occurrence of the configured time slot is determined by the switching circuits 211 from the channel counter 181' and assigned channel number in lines 175', in the same manner as the switching circuits 153 of FIG. 4, as well as control signals on lines 213. Status information is placed on the bus 133 during a transfer of data between nodes while the receipt of commands and addresses into registers 193 and 199 from the system controller occurs prior to or after data transfer, earlier to read data out of flash memory into one or both of registers A and B for transfer to another node or later to program into flash memory data that have been transferred into these registers from another node.

A set of commands to operate the memory system of FIGS. 2-5, all issued by the controller 130 through its ring bus node 128 (FIG. 2), are shown in FIGS. 6A-6I. The transmission of command and data on respective bus lines 135 (CMND) and 133 (DATA) through three nodes of the ring bus are shown for convenience, as they occur in time sequence. Of course, the memory system is likely to have far more than three ring bus nodes, wherein the pattern shown in FIGS. 6A-6I is expanded to show the signals at each node, those of one node being delayed by one clock cycle from those of the immediately preceding node. It will be noted that a pip is sent on the command line in the clock cycle immediately preceding each command, in this specific example, and to also mark the beginning to data sent on the data line. Rather than the single cycle pip illustrated, the pip before each command may occupy multiple clock cycles and may be defined as a unique code that is required to enable the subsequent command. This would provide greater immunity to false detection of a transmitted command.

The commands of FIGS. 6A, 6B and 6C are configuration commands that are executed by every node on the ring bus. By the alternative commands of either of FIG. 6A or 6B, a unique node identification (ID) number is stored in the registers 165 and 165' (FIGS. 4 and 5) of each node. In FIG. 6A, a Set ID command is sent on the command bus line 135, its beginning being marked by a pip. A unique identification number (ID) then follows on the data line 133, its beginning also being marked by a pip on the command line. The ID number received by the first node on the bus after the controller node is incremented by a circuit that is part of the node switching circuits 153 or 211 (FIGS. 4 and 5), and the incremented number is then transmitted to the next node in order around the ring bus.

In FIG. 6B, the sequence of ID numbers used by successive nodes of the ring bus is determined by the controller circuits 130 (FIG. 2) instead of by an incrementing circuit of the preceding nodes. This allows a greater flexibility in assigning ID numbers to nodes. The controller 130 transmits not just a single ID number for the first adjacent node on the ring bus, but rather transmits a string of ID numbers, one for each node on the bus. Each node strips off the first ID number it receives and re-transmits the rest to the next node in order on the ring bus.

A Reset Channels command is illustrated in FIG. 6C, the controller sending the command over the command bus line 135 that is received and executed by each node on the system. When this command is received by a node, its assigned channel number registers 167 and 167' (FIGS. 4 and 5) are reset.

The three commands of FIGS. 6D, 6E and 6F are directed to and received by an identified command node on the ring bus system, such as the command node 127 (FIGS. 2 and 5). The Address Input command of FIG. 6D identifies a flash memory address that is to be accessed. It is sent around the bus on the command line 135 while the ID number of the one command node intended to receive the command is sent on the data line 133. Following the node ID is the address of the memory cell array at which some operation is to be performed in a subsequent step. The one node having an ID in its register 165' that matches the ID sent by the controller then loads this address into its address register 199 (FIG. 5). The same ID and address are passed around the bus from node to node but only the one command node with a matching ID enables itself to accept and store the address.

A set of related commands is shown in FIG. 6E that operate on the portion of flash memory that has been addressed by one or more Address Input commands of FIG. 6D. A unique code for one of the commands listed in FIG. 6E is sent on the command line 135 while the ID of the one command node to which the command is directed is sent on the data line 133. The command is then loaded into the command register 193 (FIG. 5) of the identified command node and immediately executed. The Read Mode command of FIG. 6E causes data in flash memory at the address or addresses previously loaded by the command of FIG. 6D to be read out of the flash memory and into a register in preparation for the data to be transferred by the ring bus. Similarly, Multi Block Program command of FIG. 6E can be used to program data from registers into two or more planes of the flash memory in parallel at the addresses previously supplied by Address Commands of FIG. 6D. If more than one command node is present in the memory system that are desired to execute one of the commands of FIG. 6E, the commands of FIGS. 6D and 6E are sent separately to each.

If status signals are desired to be sent by a command node during a read, program or other operation, the Status Read command of FIG. 6F is used to set up the command node to do so. The unique command is sent on the command line 135, while the ID of the one command node desired to be set-up with the command is sent on the data line 133. The channel number on which the status information is to be sent follows the node ID on the data line. This channel number is then loaded into the assigned channel number register 167' (FIG. 5).

FIG. 6G shows related Input and Output commands that are used to condition a data node to transfer data between the data line 133 of the ring bus and one of the registers A or B, in response to a subsequent Data command. The input or output command is placed on the command bus line 135 by the controller, followed by the ID of the intended node, the channel number (time slot) over which the data are to be transferred, the register A or B with which the data are to be transferred and the length of the data transfer. The channel number that is sent is then loaded into the register 167 (FIG. 4) of the data node, the selected register A or B and the length of the data transfer being temporarily stored within the decoder 163 and provided by respective decoder outputs 177 and 176.

Once all involved data nodes are configured for a data transfer to take place by receiving and executing the commands of FIG. 6G, one at a time, the Data On command of FIG. 6H causes the transfer to take place. The Data On command is sent by the controller on the command line 135 of the bus and configuration parameters necessary to carry out the transfer are sent on the data line 133. These parameters include the number C of channels (time slots) that are being used for the data transfer, the number N of cycles in a group of time slots and the number D of nodes on the ring bus, following the grouped channel transfer illustrated by the timing diagram of FIG. 3C. These parameters are stored in the data nodes (FIG. 4) and provided to the channel counter 181 on lines 184, 185 and 186 during the data transfer. Data are then transferred into or out of one of the registers A or B of each node that has received an Input or Output command of FIG. 6G, as directed by the command, on a unique channel for each node that was specified by that command.

The Data On command of FIG. 6H causes the data being transferred to circle around the ring bus in their assigned time multiplexed channels. A limited amount of data may be transferred in each data channel depending upon the width of the channels; i.e., the length of time allotted to each. In FIG. 6H, the individual channels (data frames) are shown to be four clock cycles in length for ease of explanation, thereby to carry four bits of data, but may in practice be made much larger than that. Each data node may transmit another frame of data before the previously transmitted frame completes a circuit around the ring bus and returns to the node, in accordance with the grouped channel cycles technique shown in FIG. 3C. This continues until all the data to be transferred from the node has been transmitted in this manner.

Prior to the controller transmitting another command node or data node command on the ring bus while data are being transferred in execution of the Data On command, the transfer needs to first be suspended. A Data Off command is shown in FIG. 6I to do this. When the Data Off command is received by a source data node during a data transfer, the node suspends the data transfer until a Data On command is subsequently received. However, destination nodes for data being transferred continue to receive any relevant data, as there may be valid data on other channels subsequent to the Data Off command. Those nodes that are configured to merely pass data through them continue to do so. One reason to suspend data transfer with the Data Off command is to be able to add channels, configure additional nodes to transmit or receive data, and the like, as can be done by use of the Input and/or Output commands after a Data Off command and before a re-configured data transfer is resumed by a subsequent Data On command. New parameters for the reconfigured data transfer are specified as part of the subsequent Data On command.

The Data Off command of FIG. 6I differs from all other commands in that it does not have an associated command code. The command may only be used when the preceding command was a Data On command. The Data Off command is signaled by the controller as an extended pip on the command line on any channel. The data line carries data appropriate to that channel, which is not associated with the Data Off command.

The overall process of transferring data between nodes by use of the commands that have just been described is outlined in FIG. 7. Data within the flash memory planes to be transferred are first moved into a register, in this example one of the registers A or B of each of one or more planes. A first step 221 causes flash memory addresses to be sent to individual command nodes in sequence that are each associated with one or more memory planes. A step 222 of reading data from the addressed locations of the plane(s) into one of its (their) associated registers A or B then follows.

These data source nodes are also configured to transfer the data by use of the Output Command of FIG. 6G for each node to be configured, as indicated by a step 223. In a step 224, data destination nodes are configured to receive these data by use of the Input Command for each node to be configured. The steps 223 and 224 can be performed concurrently with the step 222. A Status Read command (FIG. 6F) may be issued after the step 222 is initiated in order to receive confirmation that the transfer of step 222 within the nodes has been completed before the transfer of data around the bus between nodes is initiated.

After completion the steps 223 and 224 to set up the source and destination nodes for the data transfer, and upon confirming that step 222 has been completed, if that is done, the Data On command of FIG. 6H is issued, in a step 225. This causes data to be moved from the registers of the source nodes to the registers of the destination nodes over the ring bus. The source and destination node registers include those of the controller node 128 (FIG. 2), which are used to receive data from or send data to the host through the controller 130.

Next, data stored in the registers of the destination nodes are programmed into the flash memory. In a step 226, the addresses within flash memory controlled by a command node are sent to that command node by the Address Input command of FIG. 6D. If there are multiple command nodes, this step is performed separately for each command node. One of the programming commands of FIG. 6E is then sent to cause programming from the registers into flash memory to occur with the maximum parallelism that is possible. By these techniques, data may be moved either or both (1) between the host through registers in the controller and locations in the flash memory, (2) just between locations within the flash memory.

Initiation of the step 226 does not need to wait for the completion of the step 225 but rather can be performed concurrently with the step 225. Concurrent operations are possible for a control node operation and a data node operation, or for two data node operations on separate registers.

An illustration of transferring data by use of the commands of FIGS. 6A-6I is given in FIGS. 8 and 9, wherein FIG. 8 schematically shows the memory system of FIGS. 2-5 with specific desired data sources and destinations that are used in the example and FIG. 9 lists the commands in sequence to effect the desired transfer. Sectors 19, 20 and 21 of data are transferred from the controller buffer RAM, having been written there by the host system, with which the memory system is connected through the controller, to be written into the flash memory. These data sectors are transferred into memory planes A, B and C, respectively. At the same time, a sector R6 of data in plane C is transferred to plane D.

The example of FIGS. 8 and 9 also shows a use of the End command (FIG. 6E) that has not yet been discussed. It is used here as command #10 (FIG. 9) to terminate the Status Read operation that was initiated by command #4. Also, the Data Off command is used twice, as commands ##9 and 14 to stop execution of the respective Data On commands ##8 and 13. The reason for the Data Off command #9 is to suspend data transfer in order to configure source and destination nodes for transfer of the sector R6, which is done by respective Output and Input commands ##11 and 12. This may be necessary because execution of the flash memory Read command #3 takes a relatively long time, during which time the commands ##4-8 can be issued by the controller. Another Data On command #13 is then issued, which adds the sector R6 to the data being transferred, in channel 0 while the transfer of data sectors 19, 20 and 21 on channels 1, 2 and 3 is resumed. After completion of the transfer of data sectors 19, 20 and 21, which will occur before the later started transfer of data sector R6 is completed, another Data Off command #14 is issued so that the subsequent Data On command #15 may reduce the number of channels being used to finish transfer of the sector R6. It is desired to specify only the number of channels needed for any data transfer taking place at most all times, thereby avoiding time slots empty of data, which adversely affects memory performance.

It will also be noted that the example data transfer illustrated in FIGS. 8 and 9 concurrently performs certain operations on the single ring bus, which is a characteristic of the architecture and command structure described above. For example, in response to the Data On command #8, three sectors 19, 20 and 21 of data are transferred concurrently, as a result of using time division multiplexing, each sector having different source and destination nodes. In response to the Data On command #13, four data sectors 19, 20, 21 and R6 are transferred around the bus together. Also, during command #4, a Status Read command is being executed on channel 0 at the same time as the transfer of data sectors 19, 20 and 21 takes place on channels 1, 2 and 3. Further, as mentioned above, commands ##4-7 and part of command #8 are executed while the flash memory Read command #3 is being executed. In addition, the data being transferred around the ring bus may be checked as they pass through the controller node by the ECC circuitry of the controller, which takes place concurrently with the data transfer.

There are many variations of the memory system architecture of FIG. 2 that can be made while still operating the system with the commands and in the manner described above. Instead of the memory chip(s) having four memory planes, the memory chip may have a single undivided memory cell array, as illustrated in FIG. 10. Two memory chips 231 and 233 are there shown to be connected with the controller chip 101 in a ring bus. Each of the memory chips 231 and 233 includes a single command node and a single data node connected by the bus in a ring as described previously. More than two memory chips may be used in a particular system.

A further possible variation is shown in FIG. 11, wherein each of two memory chips 235 and 237 are also connected with the controller chip 101 on the ring bus but each memory chip includes a single combined command and data node 239 and 241 respectively. The nodes 239 and 241 individually have the separate node circuitry of FIGS. 4 and 5 combined into one circuit. The advantage to this is that the node circuitry can be reduced by eliminating duplicate components such as the switching circuits, the command decoders, the channel counter, various storage registers, and the like.

In order to provide memory integrated circuit chips that are backward compatible with conventional controllers that communicate with the memory chips over a single parallel bus, the memory chips may include a conventional bus interface as well as ring bus nodes and external connections. Such a memory chip is shown in FIG. 12. It contains four ring bus nodes 245-248, each connected to one input of one of four multiplexers 251-254. The other input of each of the multiplexers 251-254 is connected through a common bus 257 to a conventional bus interface circuit 259, which provides a conventional bus 261 that is terminated in external connection pads of the memory chip. These bus pads are then connected with a system controller and optionally other memory chips. Either a conventional controller 263, similar to the controller 11 of FIG. 1, or a controller 265 with a ring bus node, similar to the controller 101 of FIG. 2, may be connected with these bus pads.

The multiplexers 251-254 of a given chip are preferably permanently set when installed in a memory system in order to connect portions of the memory array and its command and control circuits (not shown in FIG. 12) either individually to the respective ring bus nodes 245-248 or in parallel to the more conventional bus 257. An external pin of the memory chip may be added for setting the multiplexers 251-254 to connect the chip to either of the types of controllers 263 or 265, according to that being used in the memory system. An input 267 of the chip's ring bus is connected to a set of input lines of the conventional bus interface 261, in this case a set of three lines. An output 269 of the ring bus is connected to another set of three different conductors of the conventional bus 269. Therefore, when the controller 265 is used in the memory system, it is connected with these two sets of lines of the conventional external bus since that bus is not being used in the conventional way. There is therefore no need to increase the number of external pads of the memory chip in order to accommodate connection with either type of controller.

An alternative to the use of an additional external pin of the memory chip to set the multiplexers 251-254 is to use pins of the conventional bus 257 that are not used as input or output lines of the ring bus. These pins may be permanently set to a predefined combination of states to set multiplexers 251-254 to select the ring bus nodes 245-248. The combination of states may be chosen to be an illegal combination that does not occur in normal operation of the conventional bus 257.

In the system examples shown in FIGS. 2, 10 and 11, the controller 130 is very similar to the existing controller 11 of FIG. 1, except that a ring bus node interface has been substituted for the memory interface 25. But rather than accessing each of the many components and functions of the controller through the single bus node interface, these components and functions may be distributed around the ring bus by individually having its own node. An example of this is shown in FIG. 13. Several ring bus nodes 275-279 are indicated to represent the command and data nodes of the memory array or arrays, either on a single integrated circuit chip or on separate chips in any of a multitude of possible configurations, including those previously illustrated and described. What is different in the system of FIG. 13 is the replacement of a single controller node with a plurality of such nodes that are individually connected with less than all of the controller circuits and functions. In this specific example, seven controller ring bus nodes 281-287 are included. They are individually connected, respectively, to a non-volatile memory cache 289, a volatile memory cache 291, ECC circuits 293, a volatile data buffer memory 295, primarily for temporary storage of data being transferred between the memory and a host, a volatile memory 297 to store firmware code being executed by a processor 299 and host interface circuits 301. Other functions can be added by the use of additional controller nodes, or one or more of the controller functions shown in FIG. 13 can be eliminated, or certain of the components and functions may be combined for connection to the ring bus through a single shared bus node.

In order that the ring bus is not burdened with transfers of commands and data internal to the controller operation, it is desirable to include a separate parallel controller bus 303 that allows direct communication between the processor 299 and certain other of the controller functions such as shown in FIG. 13. An additional non-volatile memory 305 may also be connected to the controller bus 303 for the storage of boot code used during initialization of the system to cause the processor 299 to load firmware into the memory 297 from the flash memory of the system. That leaves the connections of certain controller components with the ring bus for use primarily when data or commands are being transferred between one of them and the flash memory components connected with the memory nodes 275-279. One example mentioned previously is passing through the ECC circuits 293 of data being transferred around the bus, particularly that read from the flash memory, to verify their validity. Errors detected by the ECC circuitry 293 within the capability of the ECC algorithm being used to correct are then preferably corrected by the processor 299. Other examples include the direct connection of the ring bus to the buffer memory 295 and cache memories 289 and 291.

It is desirable to make the memory chip easy to connect with a controller either by itself or also to one, two or more other memory chips. In the manufacture of memory cards, a controller and one or more memory chips are physically attached to a small printed circuit board (PCB) that also provides electrical conductors for interconnecting the chips and external contacts of the card. It is relatively straightforward to provide the PCB with the capability to include a variable number of memory chips from one to some limited number, in order to be able to manufacture cards with different storage capacities, when a conventional parallel bus is used on the PCB. But when the one or more memory chips are connected to a ring bus, the portion of the ring bus on the PCB that connects the memory chip(s) and the controller chip together needs to be able to accommodate a variable number of series connected chips. Since the output of the last memory chip in the series is connected back to the controller, some way of easily doing this with different numbers of memory chips is desirable.

One such technique for doing so is illustrated in FIG. 14. A controller chip 311 and two memory chips 313 and 315 are connected together on a single PCB as part of a memory card. The controller 311 includes at least one bus node and each of the memory chips includes multiple bus nodes. The memory chip 313 has a bus input 317 connected with a bus output of the controller chip 311, and a first output 319 that is connected to a bus input of the second memory chip 315. A second output 321 is also provided on the memory chip 313 and connected to a portion 323 of the bus that is included on the PCB between chips to return the output of the last memory chip in the series to a bus input of the controller chip 311. But since the memory chip 313 is not the last in the series, its return output 321 is disabled on the chip while the output 319 remains operable. The second memory chip 315 similarly has two bus outputs 325 and 327, since all the memory chips are most easily made to be the same, the return output 327 remaining enabled since the chip 315 is the last in the series. Its connection with the PCB bus return portion 323 then completes the ring. The second output 325 of the chip 315 is then disabled on the chip 315 and need not be connected to anything.

Although the arrangement of FIG. 14 allows a relatively easy connection of a variable number of chips in series, the length of the bus portion 323 on the PCB can in many cases have a level of capacitance that is significantly higher than that of the bus segments on the chips. Since this can limit the operating frequency of the entire ring bus, it is further desired to provide the return bus path in a manner that can minimize this effect. This is accomplished in the card system of FIG. 15 by forming most of the return path on memory chips 331 and 333 themselves and by breaking the return path into shorter segments that are individually driven. The maximum capacitance of any segment of the ring bus is then maintained at a low level.

Taking the memory chip 331 as an example, it has a ring bus input 335 and an output 337 for connection to the next memory chip in the series, if there is one (as there is in FIG. 15). A second output 339 for return to the controller is maintained within the memory chip. A portion 341 of the return path is included in the memory chip rather than on the PCB. The return path 341 is connected to a stage 343 that includes a one clock cycle delay to decouple its input and output bus segments and drivers to drive a return output 345, similar to the nodes described earlier. For instances when the memory chip is not the last in the series, as the chip 331 is not in FIG. 15, a return bus input 347 is provided for the next in order memory chip to connect its return bus output.

In the two-memory chip example of FIG. 15, the output 337 of the first chip 331 is made operable for connection to an input of the next memory chip 333 in the series, while its return output 339 is disabled. A return output 349 of the second memory chip 333 is made to be operable, since it is the last chip in the series. The bus then follows a return path on the chip 333 to the input 347 of the first chip 331, through a register and driver circuit 351 that is the same as the circuit 343. Indeed, it is highly desirable to make only one memory integrated circuit chip that can be connected in any of multiple positions within a series string. A second output 353 of the last memory chip 333 is disabled and remains unconnected. And, of course, nothing is connected to a return bus input 355 of the last chip 333.

Although the various aspects of the present invention have been described with respect to exemplary embodiments thereof, it will be understood that the present invention is entitled to protection within the full scope of the appended claims.

It is claimed:

1. A method of operating a memory system, said system comprising a plurality of re-programmable non-volatile memory units that each includes a data communications node and that each comprises memory storage cells grouped into blocks of memory cells that are simultaneously erased prior to reprogramming, by transferring data around a ring bus connecting said nodes and a controller together, said method comprising:

passing controller configuration commands that include node identification information in a given direction around the ring bus from the controller to the command and data communications nodes, said node identification information in each of the configuration commands including information for identifying nodes to be established as source or destination nodes, the configuration commands being acted upon only by the nodes identified by said node identification information, causing nodes of a plurality of the memory units identified in a controller configuration command to be established as source nodes from which data is to be transferred through a subsequent controller transfer command and causing the nodes of a plurality of the memory units identified in the controller configuration command to be established as destination nodes to which data is to be transferred through a subsequent controller transfer command, wherein no data transfer occurs when said controller commands are passed around the ring bus, reading data to be transferred from the plurality of memory units of source nodes into temporary data storage provided at said source nodes, thereafter issuing said subsequent controller transfer command to transfer the read data from the temporary data storage at said source nodes to the data lines substantially simultaneously only in the given direction around the ring bus, writing the transferred read data in the data lines into temporary data storage provided at said destination nodes, and thereafter writing the transferred data from the temporary data storage at said destination nodes into the plurality of memory units of said destination nodes, wherein transferring the read data includes transferring data around the ring bus from said of source nodes in at least two sequential time slots and said at least two sequential time slots defining a cycle of C sequential time slots, and N time slots being used in the transferrin of read data, N and C being positive integers, wherein transferrin the read data additionally includes inserting one or more unused time slots so that N is equal to the total number of nodes on the ring bus minus the number of unused time slots, and adjusting N and C to reduce a number of any unused time slots.

2. The method of claim 1, wherein passing said controller configuration command around the ring bus includes passing said controller configuration command from the controller through a controller node connected into the ring bus.

3. The method of claim 2, which additionally comprises transferring data to and from a host through buffer memory included within the controller and the controller node.

4. The method of claim 1, which additionally comprises transferring data to and from a host through another node connected into the ring bus.

5. The method of claim 1, wherein writing the transferred data includes writing the data being transferred into said plurality of destination nodes from different ones of said at least two sequential time slots, and said subsequent controller transfer command causes a simultaneous transfer of multiple channels of data from said plurality of source nodes to said plurality of destination nodes in a single direction over a number of time-multiplexed data frames.

6. The method of claim 5, wherein passing controller commands around the ring bus does not include the use of sequential time slots.

7. The method of claim 1, wherein transferring the read data around the ring bus includes transferring the read data completely around the ring from said at least one source node and back to said at least one source node.

8. The method of claim 7, which additionally comprises verifying at said at least one source node the validity of the read data after being transferred completely around the ring, wherein verifying the validity of the read data includes comparing the read data after being transferred completely around the ring with the read data placed on the ring bus at said at least one source node.

9. The method of claim 8, which additionally comprises checking all of the read data around the ring bus with an error correction scheme at a location on the ring bus.

10. The method of claim 9, wherein checking the read data with an error correction scheme occurs in the controller.

11. The method of claim 10, wherein checking the read data with an error correction scheme includes passing all of the read data around the ring bus through error correction circuitry connected to the ring bus through a node in addition to said at least one source node and said at least one destination node.

12. The method of claim 1, wherein the controller configuration command passed around the ring bus to establish at least one of the nodes as a source of data to be transferred and at least one other of the nodes as a destination of data to be transferred originate only with the controller.

13. The method of claim 1, which additionally comprises, prior to transferring the read data around the ring bus, sending controller commands and data around the ring bus from the controller to configure the plurality of nodes.

14. The method of claim 1, wherein transferring the read data around the ring bus includes imposing a delay at individual ones of the plurality of nodes of one or more cycles of a system clock source to which the transferring read data are synchronized.

15. The method of claim 1, wherein passing said controller configuration command around the ring bus includes doing so on at least a first conductor of the ring bus and transferring the read data around the ring bus includes doing so on at least a second conductor of the ring bus different from the first conductor.

16. The method of claim 1, wherein passing said controller configuration command around the ring bus includes (1) establishing said at least one of the nodes as a source of data by at least one other of the plurality of nodes receiving the controller configuration commands and then configuring said at least one of the nodes as a source of data, and (2) establishing said at least one of the nodes as a destination of data by at least one other of the plurality of nodes receiving the controller configuration commands and then configuring said at least one of the nodes as a destination of data.

17. The method of claim 1, wherein writing the transferred data into the memory connected with said at least one destination node includes writing the transferred data into at least a second unit of re-programmable non-volatile memory cells that are connected to said at least one destination node.

18. The method of claim 17, wherein the first and second units of memory cells include respective first and second planes of less than all the memory cells on a single integrated circuit chip.

19. The method of claim 17, wherein the first and second units of memory cells include an entire memory cell array on respective first and second integrated circuit chips.

20. The method of claim 2, which additionally comprises temporarily storing the read data in a buffer memory connected to another of the plurality of nodes different from the controller node, said at least one source node and said at least one destination node.

21. The method of claim 1, wherein reading data into temporary data storage includes transferring the read data into one of at least two data registers provided at said at least one source node.

22. The method of claim 1, wherein writing data into temporary data storage includes writing the transferred data into one of at least two data registers provided at said at least one destination node.

23. The method of claim 1, which additionally comprises simultaneously reading a second set of data from memory connected to one of the plurality of nodes into one portion of temporary data storage at said one of the plurality of nodes and writing a third set of data from the ring bus into another portion of temporary data storage at said one of the plurality of nodes.

24. A memory system, comprising:
a plurality of re-programmable non-volatile memory units that each includes a data communications node, and that each comprises memory storage cells grouped into blocks of memory cells that are simultaneously erased prior to reprogramming,
a host data input/output circuit having another data communications node,
a bus connecting the individual data communication nodes together in a ring, and
a controller including a micro-controller operably connected with the ring bus to cause a simultaneous transfer of multiple channels of data from a plurality of the data communications nodes completely around the ring bus in a single direction over a number of time-multiplexed data frames adapted to include the number of multiple channels of data being transferred, said controller passing controller configuration commands that include node identification information in a given direction around the ring bus from the controller to the nodes, said node identification information in each of the configuration commands including information for identifying nodes to be established as source or destination nodes, the configuration commands being acted upon only by nodes addressed by such node identification information, in order to establish nodes of a plurality of the memory units identified in the controller configuration command as source nodes from which data is to be transferred through a subsequent controller transfer command and to establish the nodes of a plurality of the memory units identified in the controller configuration command as destination nodes to which data is to be transferred through a subsequent controller transfer command, wherein no data transfer occurs when said controller configuration commands are passed around the ring bus, said controller thereafter issuing said subsequent controller transfer command to transfer data from the source nodes to the destination nodes in the given direction around the ring bus,
wherein transferring the read data includes transferring data around the ring bus from said plurality of source nodes in at least two sequential time slots and said at least two sequential time slots defining a cycle of C sequential time slots, and N time slots being used in the transferring of read data, N and C being positive integers, wherein transferring the read data additionally includes inserting one or more unused time slots so that N is equal to the total number of nodes on the ring bus minus the number of unused time slots, and adjusting N and C to reduce a number of any unused time slots.

25. The memory system of claim 24, wherein the controller is further operably connected through the ring bus to send controller configuration commands over the ring bus to selected ones of the communication nodes for transfer of data therethrough.

26. The memory system of claim 25, wherein the at least one memory unit additionally includes a configuration circuit and a command node connected to the ring bus and the configuration circuit for receiving and executing the controller configuration commands from the controller.

27. The memory system of claim 24, wherein at least the data communications node of the at least one memory unit includes at least two registers connected to simultaneously store at least two pieces of data being transferred between the memory sub-system and the ring bus.

28. The memory system of claim 24, wherein the controller includes the host data input/output circuit and the controller is connected to the ring bus through said another data communications node.

29. The memory system of claim 24, wherein the controller is connected to the ring bus through a command signal node.

30. The memory system of claim 24, wherein the plurality of memory units include two or more memory planes on a single integrated circuit chip.

31. The memory system of claim 24, wherein the plurality of memory units are formed on respective separate integrated circuit chips.

32. The memory system of claim 24, which additionally comprises an error correction circuit operably connected with the ring bus to enable the multiple channels of data to pass therethrough and checked for errors as they are transferred around the ring bus.

33. The memory system of claim 32, wherein the controller includes the error correction circuit.

34. A method of operating a memory system, said system comprising a plurality of re-programmable non-volatile memory units that each includes a data communications node and that each comprises memory storage cells grouped into blocks of memory cells that are simultaneously erased prior to reprogramming, by transferring data around a ring bus connecting said nodes, at least one command node and a controller together, said method comprising:
passing controller configuration commands that include node identification information in a given direction around the ring bus from the controller to the command and data communications nodes, said node identification information in each of the configuration commands including information for identifying the nodes to be established as source or destination nodes, the configuration commands being acted upon only by the nodes identified by said node identification information, causing nodes of a plurality of the memory units identified in a controller configuration command to be established as source nodes from which data is to be transferred through a subsequent controller transfer command and causing the nodes of a plurality of the memory units identified in the controller configuration command to be established as destination nodes to which data is to be transferred through a subsequent controller transfer command, wherein no data transfer occurs when said controller commands are passed around the ring bus,
reading data to be transferred from the plurality of memory units of source nodes into temporary data storage provided at said source nodes, wherein read commands for reading data and the node identification information identifying the source nodes are first stored at the at least one command node and then executed to cause such, transfer of data into the temporary data storage,
thereafter issuing said subsequent controller transfer command to transfer the read data from the temporary data storage at said source nodes to the data lines substantially simultaneously only in the given direction around the ring bus, writing the transferred read data in the data lines into temporary data storage provided at said destination nodes, and thereafter writing the transferred data from the temporary data storage at said destination nodes into the plurality of memory units of said destination nodes, wherein transferring the read data includes transferring data around the ring bus from said plurality of source nodes in at least two sequential time slots, and said at least two sequential time slots defining a cycle of C sequential time slots, and N time slots being used in the transferring of read data, N and C being positive integers, wherein transferring the read data additionally includes inserting one or more unused time slots so that N is equal to the total number of nodes on the ring bus minus the number of unused time slots, and adjusting N and C to reduce a number of any unused time slots.

35. The method of claim 34, wherein the ring bus connects said nodes, a plurality of command nodes and a controller together, each of the command nodes associated with corresponding set of one or more memory planes, wherein the node identification information identifying the source nodes of each set of one or more memory planes is stored at the corresponding command node.

36. A memory system, comprising: a plurality of re-programmable non-volatile memory units that each includes a data communications node, and that each comprises memory storage cells grouped into blocks of memory cells that are simultaneously erased prior to reprogramming, a host data input/output circuit having another data communications node, at least one command node, a bus connecting the individual data communication nodes and said at least one command node together in a ring, and a controller including a micro-controller operably connected with the ring bus to cause a simultaneous transfer of multiple channels of data from a plurality of the data communications nodes completely around the ring bus in a single direction over a number of time-multiplexed data frames adapted to include the number of multiple channels of data being transferred, said controller passing controller configuration commands that include node identification information in a given direction around the ring bus from the controller to the nodes, said node identification information in each of the configuration commands including information for identifying the nodes to be established as source or destination nodes, the configuration commands being acted upon only by the nodes addressed by such node identification information, in order to establish the nodes of a plurality of the memory units identified in the controller command as source nodes from which data is to be transferred through a subsequent controller transfer command and to establish the nodes of a plurality of the memory units identified in the controller command as destination nodes to which data is to be transferred through a subsequent controller transfer command, wherein no data transfer occurs when said controller configuration commands are passed around the ring bus, said controller thereafter issuing said subsequent controller transfer command to transfer data from the source nodes to the destination nodes in the given direction around the ring bus, wherein read commands for reading data and the node identification information identifying the source nodes are first stored at the at least one command node and then executed to cause such transfer of data into the temporary data storage, wherein transferring the read data includes transferring data around the ring bus from said plurality of source nodes in at least two sequential time slots, and said at least two sequential time slots defining a cycle of C sequential time slots, and N time slots being used in the transferring of read data, N and C being positive integers, wherein transferring the read data additionally includes inserting one or more unused time slots so that N is equal to the total number of nodes on the ring bus minus the number of unused time slots, and adjusting N and C to reduce a number of any unused time slots.

37. The system of claim 36, said system comprising a plurality of command nodes, wherein the ring bus connects said nodes, a plurality of command nodes and a controller together, each of the command nodes associated with corresponding set of one or more memory planes, wherein the node identification information identifying the source nodes of each set of one or more memory planes is stored at the corresponding command node.

* * * * *